United States Patent [19]
Shimizu

[11] Patent Number: 5,377,484
[45] Date of Patent: Jan. 3, 1995

[54] DEVICE FOR DETECTING DETERIORATION OF A CATALYTIC CONVERTER FOR AN ENGINE

[75] Inventor: Yasuhiro Shimizu, Nishikamo, Japan

[73] Assignee: Toyota Jidosha Kabushiki Kaisha, Aichi, Japan

[21] Appl. No.: 149,805

[22] Filed: Nov. 10, 1993

[30] Foreign Application Priority Data

Dec. 9, 1992 [JP] Japan .................. 4-329406

[51] Int. Cl.⁶ .................................. F01N 3/28
[52] U.S. Cl. ........................ 60/276; 60/277; 60/285; 123/292
[58] Field of Search ............. 60/274, 276, 277, 285; 123/291, 292

[56] References Cited

U.S. PATENT DOCUMENTS

| Re. 33,942 | 6/1993 | Katsuno et al. | |
|---|---|---|---|
| 4,739,614 | 4/1988 | Katsuno et al. | |
| 5,074,113 | 12/1991 | Matsuoka | 60/276 |
| 5,207,057 | 5/1993 | Kayanuma | 60/276 |
| 5,228,287 | 7/1993 | Kuronishi | 123/692 |
| 5,233,829 | 8/1993 | Komatsu | 60/277 |

FOREIGN PATENT DOCUMENTS

| 3443649A1 | 6/1986 | Germany . |
| 3916467A1 | 11/1990 | Germany . |
| 60-2445 | 2/1985 | Japan . |
| 64-8332 | 1/1989 | Japan . |
| 4-112949 | 4/1992 | Japan . |
| 2225860A | 6/1990 | United Kingdom . |

OTHER PUBLICATIONS

SAE Technical Paper Series; William B. Clemmens, Michael A. Sabourin and Thomas Rao; "Detection of Catalyst Performance Loss Using On-Board Diagnostics".

SAE Technical Paper Series; John W. Koupal, Michael A. Sabourin and William B. Clemmens; "Detection of Catalyst Failure On-Vehicle Using the Dual Oxygen Sensor Method".

Primary Examiner—Douglas Hart
Attorney, Agent, or Firm—Oliff & Berridge

[57] ABSTRACT

In an engine having two or more cylinder groups and a common exhaust passage with which exhaust passages individually connected to the respective cylinder groups are merged, the exhaust gases in the respective individual exhaust passage mix each other in the common exhaust passage before flowing into catalytic converter disposed in the common exhaust gas passage, therefore, when the air-fuel ratios of the respective cylinder groups are individually controlled, the air-fuel ratio of the exhaust gas in the common exhaust passage does not correspond to air-fuel ratio of the exhaust gas in any of the individual exhaust passages, and this makes it difficult to detect the deterioration of the catalyst based on the output of the upstream $O_2$ sensor disposed in the individual exhaust passage and the downstream $O_2$ sensor disposed in the common exhaust passage. In the present invention, the control circuit estimates the air-fuel ratio of the exhaust gas after mixed by averaging the outputs of the upstream air-fuel ratio sensors disposed in the respective individual exhaust passages, and detects the catalyst deterioration using the average output of the upstream air-fuel ratio sensor and the output of the downstream $O_2$ sensor.

16 Claims, 17 Drawing Sheets

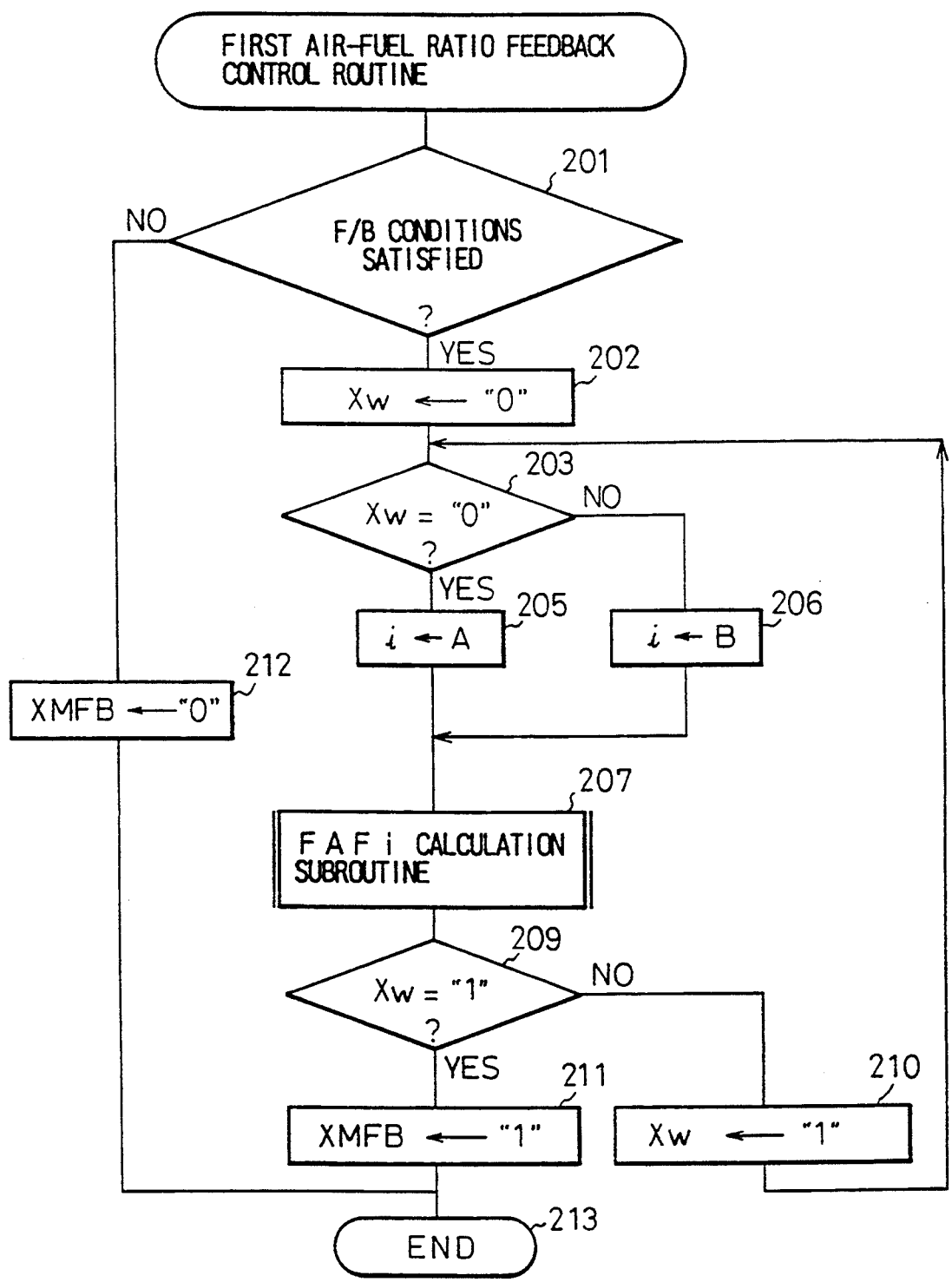

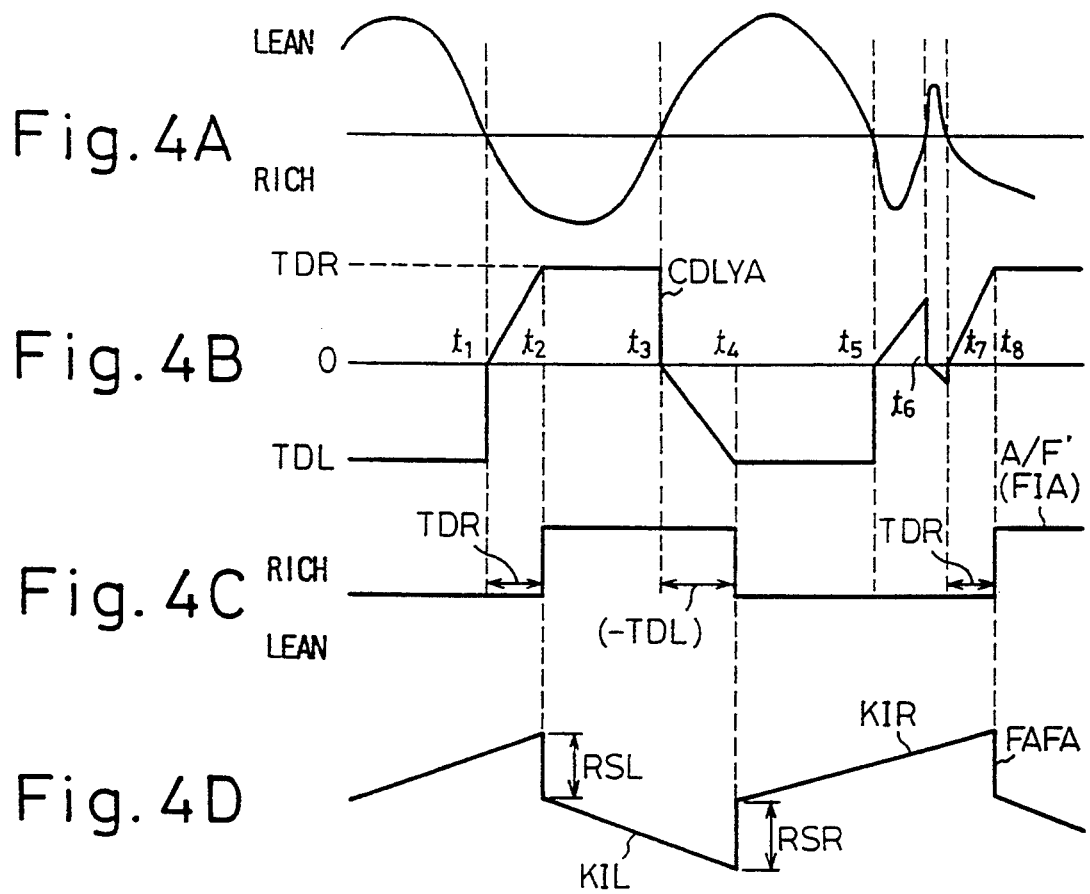

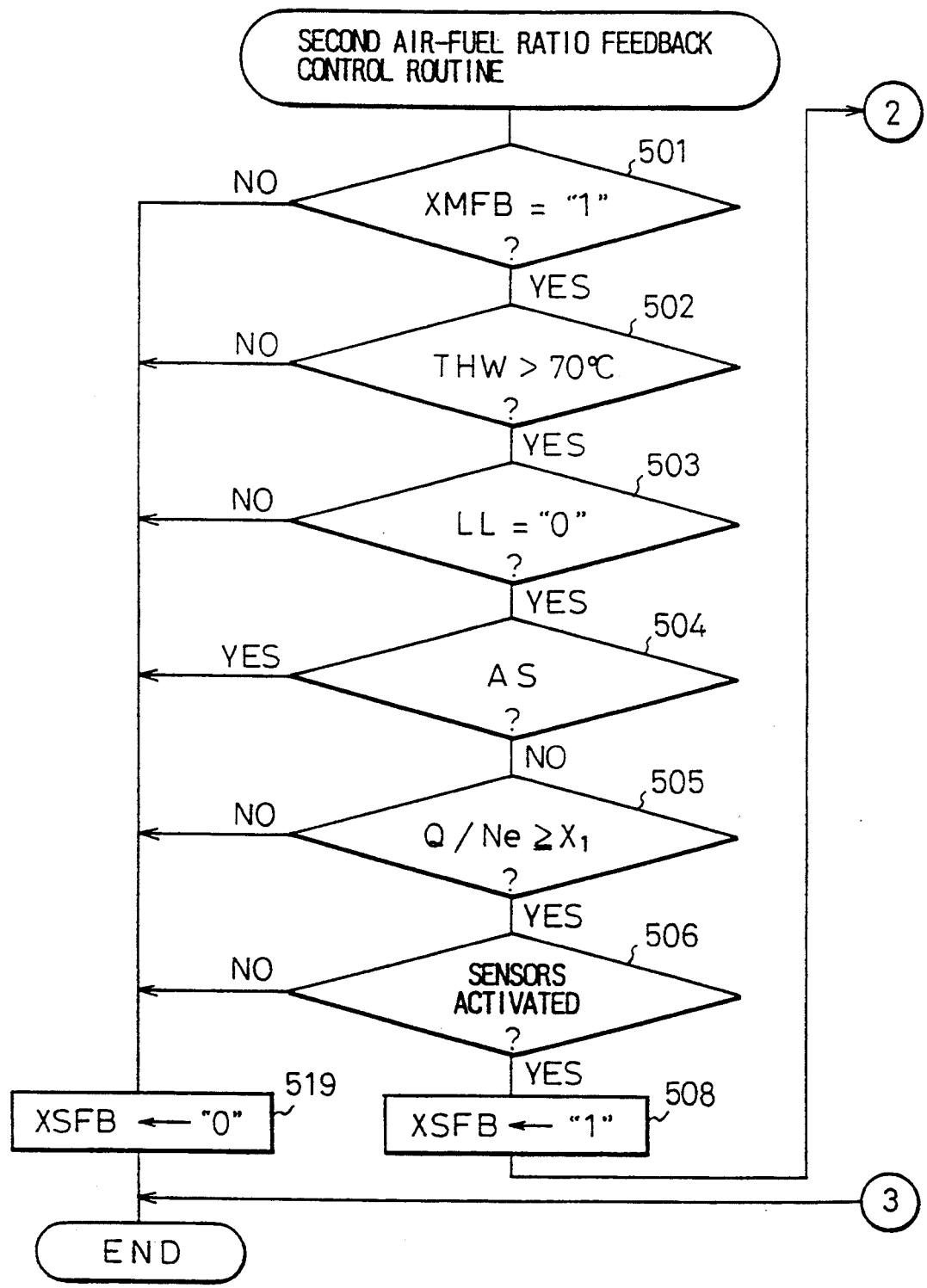

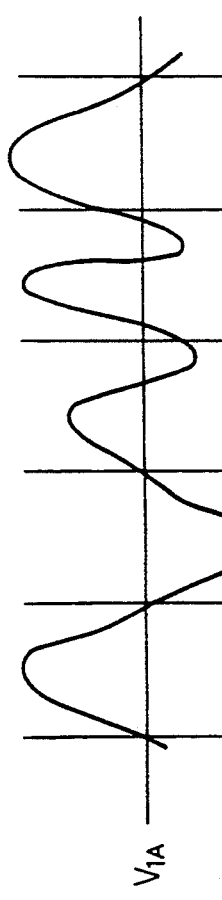
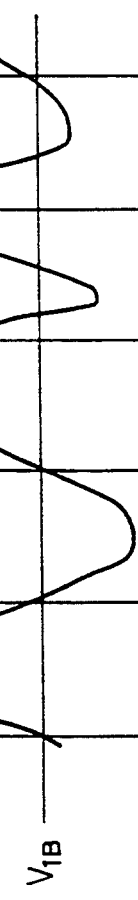
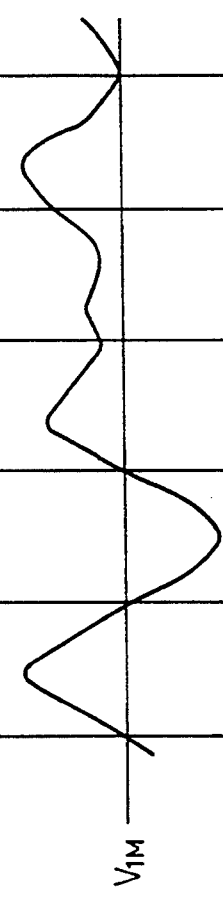
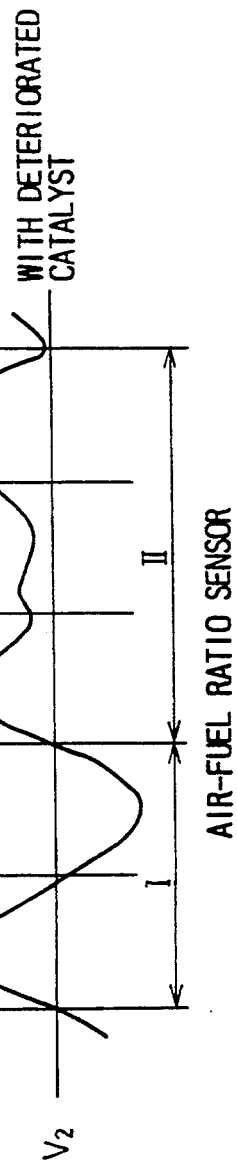
Fig.7A $V_{1A}$
Fig.7B $V_{1B}$
Fig.7C $V_{1M}$
Fig.7D $V_2$

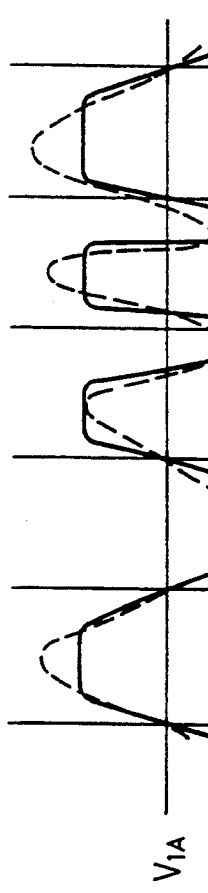
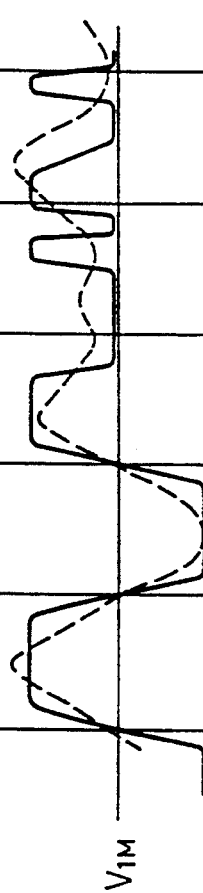
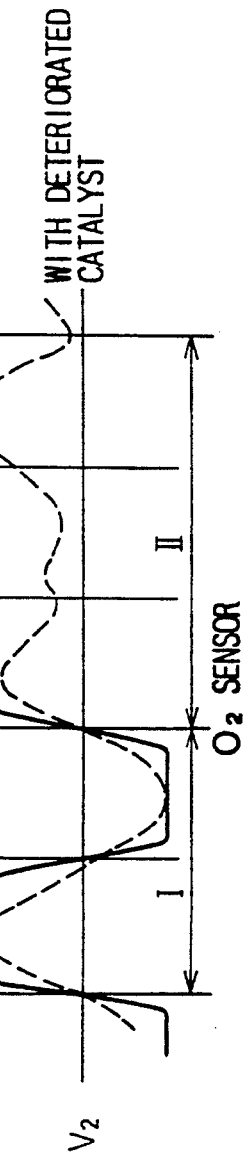
Fig. 8A  $V_{1A}$
Fig. 8B  $V_{1B}$
Fig. 8C  $V_{1M}$
Fig. 8D  $V_2$

DEVICE FOR DETECTING DETERIORATION OF A CATALYTIC CONVERTER FOR AN ENGINE

BACKGROUND OF THE INVENTION

1. Field of the Invention

The present invention relates to a device for detecting the deterioration of a catalytic converter on an internal combustion engine, and more particularly, relates to a device which is capable of detecting the deterioration of a catalytic converter disposed in the common exhaust passage of an engine having cylinders divided into multiple-cylinder groups such as a V-type or horizontally-opposed engine.

2. Description of the Related Art

An air-fuel ratio control device for controlling the air-fuel ratio of an engine by feedback control based on an output signal of an $O_2$ sensor, which generates a voltage signal depending on whether an air-fuel ratio of the exhaust gas is on rich side or lean side compared to a stoichiometric air-fuel ratio, disposed in an exhaust passage upstream of a catalytic converter is known as a single $O_2$ sensor system. The single $O_2$ sensor system is used to control the air-fuel ratio of the engine at a stoichiometric air-fuel ratio and to reduce polluting exhaust emissions by utilizing the capacity of a three-way catalytic converter to the maximum.

Also, to compensate for individual differences in the output characteristics of the $O_2$ sensors, or changes thereof due to aging, a double $O_2$ sensor system using two $O_2$ sensors has been developed (U.S. Pat. No. 4,739,614). In the double $O_2$ sensor system, $O_2$ sensors are disposed upstream and downstream of the catalytic converter in the exhaust passage, and the air-fuel ratio control is carried out based on the output of the downstream $O_2$ sensor as well as the output of the upstream $O_2$ sensor. According to the double $O_2$ sensor system, since fluctuations in the output of the upstream $O_2$ sensor are compensated for by a feedback control using the output of the downstream $O_2$ sensor, good emission control characteristics are maintained even when the output characteristics of the upstream $O_2$ sensor deteriorate.

Nevertheless, even in the double $O_2$ sensor system, if the catalyst in the catalytic converter deteriorates, the ability of the catalyst to remove pollutants in the exhaust gas such as HC, CO, $NO_x$ falls. Therefore, it is necessary to detect deterioration of the catalyst in the catalytic converter accurately.

To detect deterioration of the catalyst in the catalytic converter used in the double $O_2$ sensor system, various methods and devices have been proposed.

For example, the deterioration of the catalyst in the catalytic converter can be determined by detecting a deterioration in the $O_2$ storage capacity of the catalyst. That is, the catalyst has an ability to adsorb oxygen from the exhaust gas when the air-fuel ratio is rich compared to the stoichiometric air-fuel ratio (i.e., the air-fuel ratio of the exhaust gas is lower than the stoichiometric air-fuel ratio), and to release the adsorbed oxygen when the air-fuel ratio is lean compared to the stoichiometric air-fuel ratio (i.e., the air-fuel ratio of the exhaust gas is higher than the stoichiometric air-fuel ratio). This capacity, i.e., the $O_2$ storage capacity of the catalyst, falls as the deterioration of the catalyst proceeds. Therefore, when the catalyst is in normal condition, the fluctuation of the air-fuel ratio of the exhaust gas downstream of the catalytic converter is small, and consequently, the fluctuation of the output of the downstream $O_2$ sensor also becomes small even if the air-fuel ratio of the exhaust gas is oscillates between a rich air-fuel ratio and a lean air-fuel ratio. On the contrary, if the catalyst has deteriorated, since the $O_2$ storage capacity also becomes small, the air-fuel ratio of the exhaust gas downstream of the catalytic converter oscillates in a similar manner as the oscillation of the air-fuel ratio of the exhaust gas upstream of the catalytic converter, and the output of the downstream $O_2$ sensor also fluctuates as the output of the upstream $O_2$ sensor fluctuates. Therefore, when the catalyst has deteriorated, the interval between reversals of the output signal of the downstream $O_2$ sensor (i.e., the period between changes of the output signal of the downstream $O_2$ sensor from a rich air-fuel ratio signal to a lean air-fuel ratio signal, or vice versa) during air-fuel ratio feedback control, becomes shorter (in other words, the number of the reversals of the output signal of the downstream $O_2$ sensor within a predetermined time becomes larger), and the amplitude of the fluctuations in the output signal of the downstream $O_2$ sensor becomes larger at the same time.

In the system disclosed in U.S. Pat. No. 4,739,614, it is determined that the catalyst has deteriorated when the ratio of the interval between the reversals of the upstream $O_2$ sensor $T_1$ to the interval between the reversals of the downstream $O_2$ sensor $T_2$, i.e., $T_1/T_2$ becomes larger than a predetermined value (or, alternatively, when the interval $T_2$ of the downstream $O_2$ sensor becomes smaller than a predetermined value).

Also, a method for detecting deterioration of the catalyst is disclosed in the copending U.S. patent application Ser. No. 957041, in which lengths and areas of the waveforms of the output signal response curves of the upstream and the downstream $O_2$ sensors are used for detecting deterioration of the catalyst. In this method, the lengths (LVOM and LVOS) of the output signal response curves of the upstream $O_2$ sensor and downstream $O_2$ sensor and, the areas (AVOM and AVOS) bounded by the response curves of the output signals of the upstream and the downstream $O_2$ sensors and the reference voltage lines thereof, are used for determining whether or not the catalyst has deteriorated.

When the catalyst is not deteriorated, the area AVOS bounded by the output response curve of the downstream $O_2$ sensor and the reference voltage line is relatively large although the length LVOS of the output signal response curve thereof is relatively small. On the other hand, the area AVOS becomes relatively small although the length LVOS becomes relatively large when the catalyst has deteriorated. In the method disclosed in the copending U.S. patent application Ser. No. 957041, the ratio of the above lengths (i.e., LVOS/LVOM) and the ratio of the above areas (i.e., AVOS/AVOM) are calculated and, the catalyst is determined as being deteriorated, for example, when the relationship between the ratios LVOS/LVOM and AVOS/AVOM fall in the hatched area in the map shown in FIG. 13. By this method, a deterioration of the catalyst can be detected accurately even if the $O_2$ sensor itself is deteriorated to some degree.

The double $O_2$ sensor system is also applied to engines, such as V-type or horizontally-opposed engines, in which the cylinders of the engine are divided into two or more cylinder groups. In this case, individual exhaust passages from the respective cylinder groups are merged into one common exhaust passage, and a catalytic converter is disposed in said common exhaust passage. The upstream $O_2$ sensors, one for each cylinder group, are disposed in the respective individual exhaust passages, and single downstream $O_2$ sensor is disposed in the common exhaust passage down stream of the catalytic converter.

An example of this type of multiple $O_2$ sensor system (which is called "triple $O_2$ sensor system") is disclosed in Japanese Unexamined Patent Publication KOKAI) No.1-8332. In this system, the air-fuel ratios of the respective cylinder groups are controlled independently from other cylinder groups based on the output signal of corresponding upstream $O_2$ sensor. However, the respective air-fuel ratio controls of the cylinder groups are corrected based on the output of the common downstream $O_2$ sensor.

However, in the triple $O_2$ sensor system, it is difficult to detect the deterioration of the catalytic converter based on the output of the downstream $O_2$ sensor. In the triple $O_2$ sensor system, since the air-fuel ratios of the respective cylinder groups are controlled independently based on the output of the corresponding upstream $O_2$ sensors, the air-fuel ratios of the respective cylinder groups do not change in a synchronous manner. In other word, frequencies, amplitudes, or phases etc. of the oscillation in the air-fuel ratios of the exhaust gases from the respective cylinder groups are different. These exhaust gases having different characteristics of oscillation of the air-fuel ratio, flow into the common exhaust passage and are mixed with each other before flowing into the catalytic converter. Consequently, the frequency, amplitude, or center value etc., of the oscillation of the air-fuel ratio of the exhaust gas flowing into the catalytic converter does not coincide with those in the oscillation of the air-fuel ratio of any of the cylinder groups.

For example, even if the air-fuel ratio of the exhaust gas in each individual exhaust passage oscillates regularly between a rich air-fuel ratio and a lean air-fuel ratio, the air-fuel ratio of the exhaust gas after mixed in the common exhaust passage may stay on either a rich air-fuel ratio or a lean air-fuel ratio, and may not change between a rich air-fuel ratio and a lean air-fuel ratio, or, in some cases, the amplitude of the oscillation of the air-fuel ratio of the exhaust gas after mixing may become very small.

In such cases, the amplitude of the oscillation of the output become very small, or in some cases, the reversal of the output signal of the downstream $O_2$ sensor does not occur even if the catalyst has deteriorated. Therefore, it is very difficult to detect a deterioration of the catalyst based on the number (or the period) of the reversals of the output signal of the downstream $O_2$ sensor. In such cases, since none of the output signals of the upstream $O_2$ sensors coincide with the air-fuel ratio of the exhaust gas flowing into the catalytic converter, it is also difficult to detect a deterioration of the catalyst based on the lengths and areas of the output signal response curves of the upstream and the downstream $O_2$ sensor using the method disclosed in the copending U.S. patent application Ser. No. 957041.

To solve the above-mentioned problem, U.S. Pat. No. 5,207,057, proposes a device for detecting the deterioration of a catalytic converter used in the triple $O_2$ sensor system, in which the individual air-fuel ratio control of the respective cylinder groups based on the respective upstream $O_2$ sensors is stopped when the detection of the deterioration of the catalytic converter is carried out. That is, when the detection of the deterioration of the catalytic converter is to be carried out, the device controls the air-fuel ratios of all the cylinder groups based on one of the upstream $O_2$ sensors, so that the air-fuel ratios of all the cylinder groups change synchronously. Thus, the changes in the air-fuel ratio of the exhaust gas flowing into the catalytic converter after mixing also becomes synchronous with the changes in the air-fuel ratio of the exhaust gases before mixing, and deterioration of the catalytic converter can be detected effectively using the output of the downstream $O_2$ sensor.

However, in the above system, the air-fuel ratio controls of the respective cylinder groups are forced to switch from the individual control to a common control so that air-fuel ratio control of each cylinder group is synchronized to one particular cylinder group. Therefore, when the air-fuel ratio feedback control is switched, the period of the air-fuel ratio feedback control of the switched cylinder groups becomes longer than usual during the period of switching. This may cause deterioration of the control characteristics and temporary deterioration of exhaust emissions.

SUMMARY OF THE INVENTION

In view of the above problems in the related art, the object of the invention is to provide a device for detecting the deterioration of a catalytic converter used for an engine having two or more cylinder groups, which is capable of detecting the deterioration of the catalytic converter disposed in the common exhaust passage of the engine accurately without causing deterioration of the control characteristics or exhaust emission.

According to the present invention, there is provided a device for detecting a deterioration of a three-way catalytic converter for an internal combustion engine. Said engine comprises, a plurality of cylinders divided into cylinder groups, individual exhaust passages connected to the respective cylinder groups, a common exhaust passage into which said individual exhaust passages are merged, upstream air-fuel ratio sensors disposed in said respective individual exhaust passages for detecting air-fuel ratios of the exhaust gases in said individual exhaust passages, a downstream air-fuel ratio sensor disposed in said common exhaust passage for detecting an air-fuel ratio of the exhaust gas in said common exhaust passage, a three way catalytic converter disposed in exhaust passage between said upstream air-fuel ratio sensors and said downstream air-fuel ratio sensor, and a means for individually controlling the air-fuel ratio of each cylinder group based on outputs of said respective upstream air-fuel ratio sensors.

The device comprises an estimating means for estimating the air-fuel ratio of a mixture of the exhaust gases from said respective individual exhaust passages flowing into said common exhaust passage based on the output signals of said upstream air-fuel ratio sensors, and, a determining means for determining whether or not said three-way catalytic converter has deteriorated, based on the output signal of said downstream air-fuel ratio sensor and said estimated air-fuel ratio of the exhaust gas flowing into said catalytic converter.

The air-fuel ratio of the exhaust gas flowing into the common exhaust passage is a mixture of the exhaust gases from the respective individual exhaust passages. Therefore, the air-fuel ratio of the exhaust gas mixture flowing into common exhaust passage can be calculated from the air-fuel ratio of the respective exhaust passages.

The device according to the present invention detects the air-fuel ratios of the exhaust gases in the respective individual exhaust passages and estimates the air-fuel ratio of the exhaust gas after mixing by calculating a average value of the air-fuel ratios of the exhaust gases in the respective individual exhaust passages.

Then, the device determines whether or not the catalyst has deteriorated using the above estimated air-fuel ratio and the output of the downstream $O_2$ sensor. Since the air-fuel ratio controls of the respective cylinder groups are not forced to be synchronized for detecting the deterioration of the catalytic converter, deterioration of the control characteristics and exhaust emissions is prevented.

BRIEF DESCRIPTION OF THE DRAWINGS

The present invention will be better understood from the description as set forth hereinafter, with reference to the accompanying drawings, in which:

FIGS. 2, 3A, 3B, 5A, 5B and 6 are flowcharts showing the routines for the air-fuel ratio feedback control carried out by the control circuit in FIG. 1;

FIGS. 4A through 4D are timing diagrams explaining the flowchart of FIGS. 3A and 3B;

FIGS. 7A through 7D are timing diagrams explaining the relationships between the outputs of the upstream air-fuel ratio sensors and the output of the downstream $O_2$ sensor when the catalyst in the catalytic converter has deteriorated;

FIGS. 8A through 8D are timing diagrams similar to FIGS. 7A through 7D, when $O_2$ sensors are used instead of the upstream air-fuel ratio sensors;

DESCRIPTION OF THE PREFERRED EMBODIMENT

Figure 1:
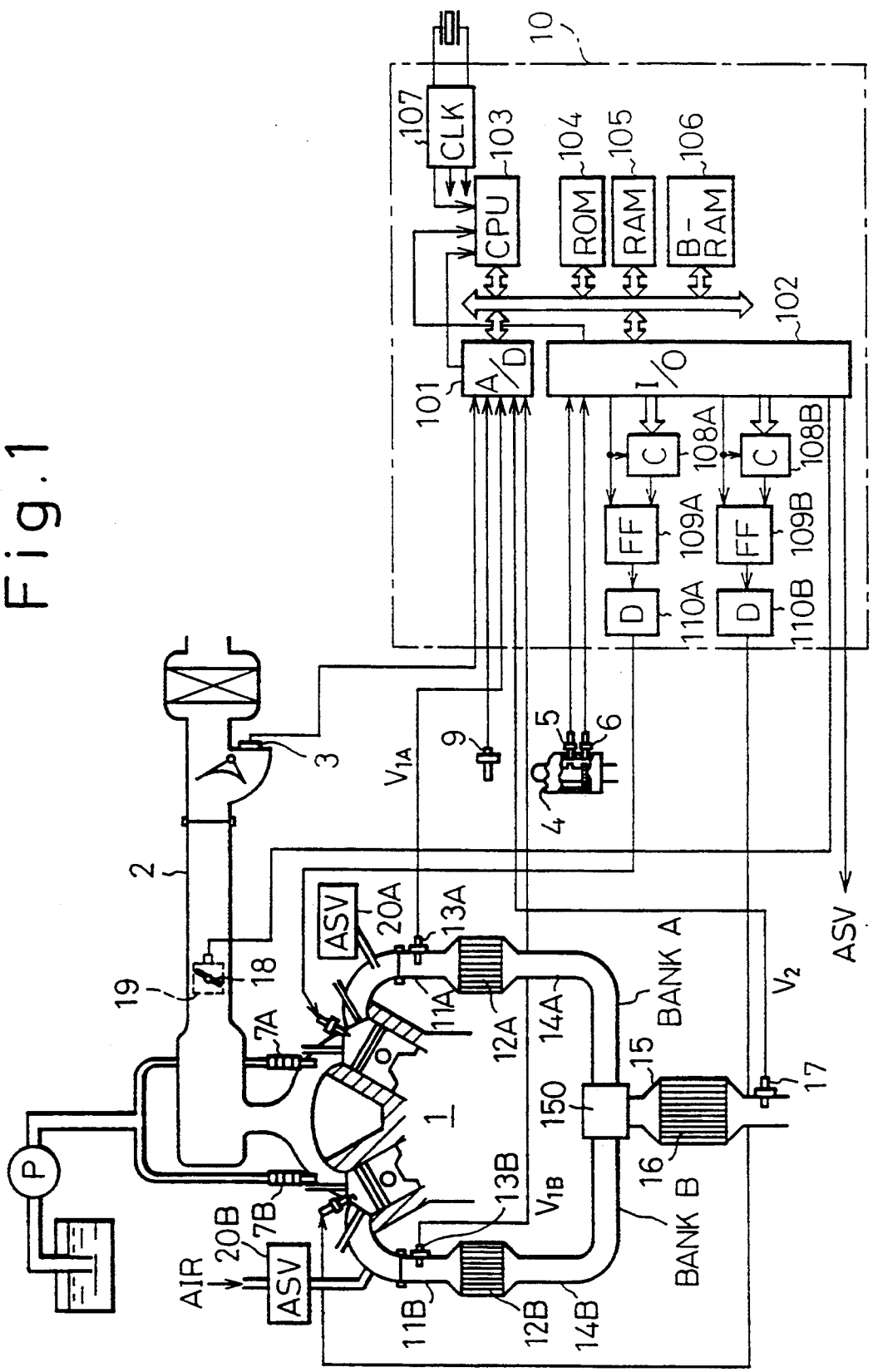
FIG. 1 is a schematic view of an internal combustion engine showing an embodiment of the present invention.

FIG. 1 schematically illustrates an embodiment of the device for detecting the deterioration of the catalytic converter according to the present invention.

In FIG. 1, reference numeral 1 represents a multiple cylinder V-type automobile engine having two groups of cylinders arranged so as to form two banks of cylinders (in FIG. 1, designated as bank A and bank B) arranged in V-shape. An air-intake passage 2 of the engine 1 is provided with a potentiometer-type air flow meter 3, for detecting an amount of air drawn into the engine 1, and which generates an analog voltage signal proportional to the amount of air flowing therethrough. The signal from the air-flow meter 3 is transmitted to a multiplexer-incorporating analog-to-digital (A/D) converter 101 of the control circuit 10. Crankangle sensors 5 and 6, for detecting the angle of the crankshaft (not shown) of the engine 1, are disposed at a distributor 4.

In this embodiment, the crankangle sensor 5 generates a pulse signal at every 720° C. crankangle (CA) and the crankangle sensor 6 generates a pulse signal at every 30° CA. The pulse signals from the crankangle sensors 5 and 6 are supplied to an input/output (I/O) interface 102 of the control circuit 10. Further, the pulse signal of the crankangle sensor 6 is then supplied to an interrupt terminal 102 of a central processing unit (CPU) 103.

In the air intake passage 2, fuel injection valves 7A and 7B are provided at inlet ports of the cylinders of bank A and the bank B A coolant temperature sensor 9 for detecting the temperature of the coolant is disposed in a cylinder block of the engine 1. The coolant temperature sensor 9 generates an analog voltage signal in response to the temperature THW of the coolant, and transmits this signal to the A/D converter 101 of the control circuit 10.

In the exhaust system, the exhaust pipes 14A and 14B are connected to the exhaust manifolds 11A and 11B of the banks A and B of the cylinders, respectively, and are merged into a common exhaust pipe 15 at a junction portion 150. Three-way reducing and oxidising catalyst converters 12A and 12B (start catalytic converter) are disposed respectively in the exhaust pipes 14A and 14B downstream of the exhaust manifolds 11A and 11B.

The catalytic converters 12A and 12B are able to remove three pollutants, CO, HC and $NO_x$ from the exhaust gas, simultaneously. The converters 12A and 12B are relatively small in size, and are installed in the engine compartment of the automobile. Due to their small capacities, the catalytic converters 12A and 12B heat up rapidly, and are activated immediately after the engine 1 is started.

An air-fuel ratio sensor 13A is provided at the exhaust manifold 11A of the bank A, i.e., upstream of t-he catalytic converter 12A, and an air-fuel ratio sensor 13B is provided at the exhaust manifold 11B of the bank B, upstream of the catalytic converter 12B. As explained below, the air-fuel ratio sensors 13A and 13B (upstream air-fuel ratio sensor) generate output signals corresponding to the air-fuel ratio of the exhaust gases in the exhaust manifolds 11A and 11B, respectively.

Another three-way reducing and oxidising catalytic converter 16 (main catalytic converter) is provided in the common exhaust pipe 15. The converter 16 is relatively large in size, and is installed underneath the body of the automobile. Since the catalytic converter 16 has a large capacity, it can remove all the pollutants CO, HC, $NO_x$ which have passed through the catalytic converters 12A and 12B.

A conventional type $O_2$ sensor 17 (downstream $O_2$ sensor) is disposed at the common exhaust pipe 15 downstream of the catalytic converter 16. The downstream O₂ sensor 17 also generates an output signal corresponding to the air-fuel ratio of the exhaust gas in the common exhaust passage 15 downstream of the catalytic converter. However, the downstream O₂ sensor 17 generates only a two state voltage output signal depending on whether the air-fuel ratio of the exhaust gas is on a rich side or on a lean side compared to the stoichiometric air-fuel ratio. In contrast to the downstream O₂ sensor 17, the upstream air-fuel ratio sensor 13A and 13B generate continuous voltage corresponding to the air-fuel ratio in over a wide range of air-fuel ratios of the exhaust gas. Namely, though it can be determined only whether the air-fuel ratio of the exhaust gas is on a rich side or lean side compared to the stoichiometric air-fuel ratio from the output signal of the downstream O₂ sensor 17, the air-fuel ratio of the exhaust gas can be detected exactly from the output signals of the upstream air-fuel ratio sensor 13A and 13B.

As for the type of the upstream air-fuel ratio sensors used in this embodiment, an explanation will be given later.

The output signals of the sensors 13A, 13B, and 17 are transmitted to the A/D converter 101 of the control circuit 10.

A throttle valve 18 operated by a vehicle driver, is provided in the intake air passage 2, together with an idle switch 19 for detecting the opening of the throttle valve and generating an LL signal when the throttle valve 18 is fully closed. This LL signal is supplied to the I/O interface 102 of the control circuit 10.

References 20A, 20B designate a secondary air supply valve for introducing secondary air into the exhaust manifold 11A, 11B, to thereby reduce the emission of HC and CO during deceleration or idling of the engine.

The control circuit 10, which may be constructed of a microcomputer, further comprises a central processing unit (CPU) 103, a read-only-memory (ROM) 104 for storing a main routine and interrupt routines such as a fuel injection routine, an ignition timing routine and constants, etc., a random-access-memory (RAM) 105 for storing temporary data, a backup RAM 106, and a clock generator 107 for generating various clock signals. The backup RAM 106 is directly connected to a battery (not shown), and therefore, the contents of the backup RAM 106 are preserved even when the ignition switch (not shown) is turned off.

A down counter 108A, a flip-flop 109A, and a drive circuit 110A are provided in the control circuit 10 for controlling the fuel injection valves 7A of the cylinder bank A.

Similarly, a down counter 108B, a flip-flop 109B, and a drive circuit 110B are provided in the control circuit 10 for controlling the fuel injection valves 7B of the cylinder bank B.

Namely, when a fuel injection amount TAUA (TAUB) is calculated in a routine, as explained later, the amount TAUA (TAUB) is preset in the down counter 108A (108B), and simultaneously, the flip-flop 109A (109B) is set, and as a result, the drive circuit 110A (110B) initiates the activation of the fuel injection valve 7A (7B). On the other hand, the down counter 108A (108B) counts up the clock signal from the clock generator 107, and finally, a logic 1 signal is generated from the terminal of the down counter 108A (108B), to reset the flip-flop 109A, (109B), so that the drive circuit 110A (110B) stops the activation of the fuel injection valve 7A (7B), whereby an amount of fuel corresponding to the fuel injection amount TAUA(TAUB) is supplied to the cylinders of the bank A (bank B).

The CPU 103 is interrupted when the A/D converter 101 completes an A/D conversion and generates an interrupt signal; when the crank angle sensor 6 generates a pulse signal; and when the clock generator 107 generates a special clock signal.

The intake air amount data Q from the airflow meter 3 and the coolant temperature data THW from the coolant sensor 9 are converted by A/D conversion routine(s) executed at predetermined intervals, and then stored in the RAM 105, i.e., the data Q and THW in the RAM 105 are updated at predetermined intervals. The engine speed Ne is calculated by an interrupt routine executed at 30° CA, i.e., at every pulse signal of the crank angle sensor 6, and is stored in the RAM 105.

The construction of the upstream air-fuel ratio sensor 13A and 13B will be explained with reference to FIG. 14.

There are several types of the air-fuel ratio sensor which can be used as upstream air-fuel ratio sensor in this embodiment. In this embodiment, the air-fuel ratio sensor of the type disclosed in Japanese Unexamined Patent Publication (Kokai) No. 60-24445 are used as upstream air-fuel ratio sensors 13A and 13B, however, other types of air-fuel ratio sensors also can be used as upstream air-fuel ratio sensors 13A and 13B in this invention.

Figure 14:
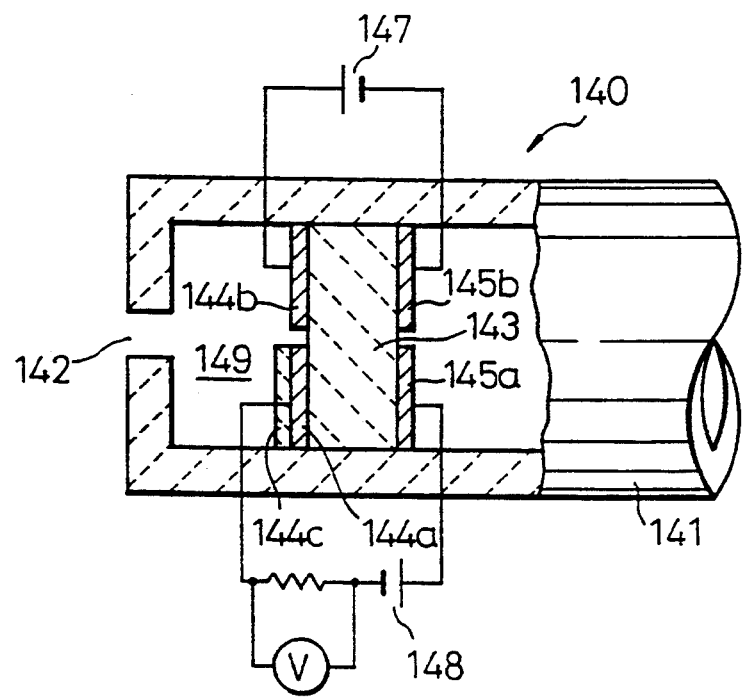
FIG. 14 is a drawing explaining a typical construction of an air-fuel ratio sensor.

FIG. 14 schematically shows the construction of the air-fuel ratio sensor used in this embodiment. In FIG. 14, an air-fuel ratio sensor 140 comprises a tubular body 141 made of ceramic material having a gas diffusion hole 142 at the closed end thereof. Numeral 143 shows a disc made of solid electrolyte material such as zirconia disposed in the tubular body 141 of the sensor. On the one side of the disc 143, two semicircular platinum electrodes 144a and 144b are disposed. Also, two semicircular platinum electrodes 145a and 145b are disposed on the opposite side of the disc. Further, on the electrode 144b a ceramic coating 144c is formed for redueing the amount of oxygen molecules in the exhaust gas to reach the electrode 144a. The sensor 140 is installed in the exhaust passage of the engine so that the electrodes 144a and 144b are exposed to the exhaust gas coming from the gas diffusion hole 142, and the electrodes 145a and 145b are exposed to the ambient air. Then, the electrode pair 144b and 145b are connected to a constant D.C. voltage source 147 to form an "oxygen pump" which transfer oxygen molecules in the ambient air into a cavity 149 defined by the closed end of the body 141 and the disc 143. The electrode pair 144a and 145a are also connected to a constant D.C. voltage source 148, but having reverse polarity to the source 147. The electrode pair 144a and 145a, together with the solid electrolyte disc 143 and the restriction coating 144c, form a lean air-fuel ratio sensor which can detect the air-fuel ratio of the exhaust gas accurately when the air-fuel ratio of the exhaust gas is lean compared to the stoichiometric air-fuel ratio.

Namely, when a D.C. voltage is imposed between electrodes 144a and 145a at more than a specified temperature of the solid electrolyte 143, the oxygen molecules in the exhaust gas are ionized on the negative electrode 144a. The oxygen ions formed on the negative electrode 144a are transfered to the positive electrode 145a through the solid electrolyte 143 to form oxygen molecules on the positive electrode 145a. By this flow of the oxygen ions, an electric current proportional to the amount of the transferred oxygen ions are formed between electrodes 144a and 145a. However, since the restriction coating 144c on the negative electrode 144a hampers the flow of the oxygen molecules therethrough, the amount of the oxygen molecules which reach the negative electrode 144a per unit time is limited to a certain maximum level.

Therefore, the current generated between the electrodes 144a and 145a is saturated at a certain level even if the voltage imposed between the electrodes is increased. The maximum amount of the flow of the oxygen molecules, thus the maximum electric current (or saturated current), is roughly proportional to the oxygen concentration of the exhaust gas when the air-fuel ratio of the exhaust gas is lean compared to the stoichiometric air-fuel ratio. Therefore, by imposing a voltage of appropriate level, the oxygen concentration of the lean air-fuel ratio exhaust gas can be detected from the saturated current, and, since the air-fuel ratio of the exhaust gas has one to one correspondence to the oxygen concentration, the air-fuel ratio of the exhaust gas can be also detected from the saturated current.

In the air-fuel ratio sensor sensor 140 in FIG. 14, the oxygen pump formed by the electrodes 144b and 145b transfers oxygen from the ambient to the cavity 149 at a constant rate. These oxygen molecules mix with the exhaust gas flowing into the cavity 149 through the gas diffusion hole 142. The voltage imposed between the electrodes 144b and 145b of the oxygen pump is selected so that the constant oxygen flow rate of the oxygen pump is sufficient to establish a lean air-fuel ratio in the cavity 149 over wide variation of the air-fuel ratio of the exhaust gas in the exhaust passage. Therefore, the oxygen concentration in the cavity 149 can be detected by the lean air-fuel ratio sensor formed by the electrodes 144a and 145a even if the air-fuel ratio of the exhaust gas in the exhaust passage is rich compared to the stoichiometric air-fuel ratio. Since the rate of the oxygen transfered to the cavity 149 by the oxygen pump is constant, the oxygen concentration, i.e., the air-fuel ratio of the exhaust gas in the exhaust passage can be obtained by correcting the output of the lean air-fuel ratio sensor by the value corresponding to the oxygen flow rate of the oxygen pump.

Figure 15:
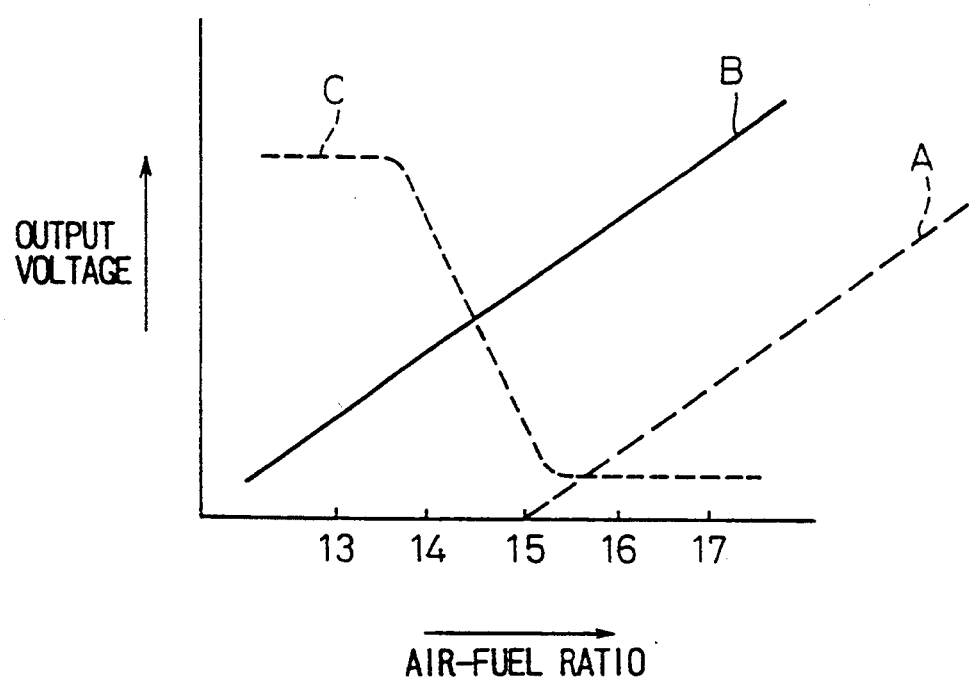
FIG. 15 is a diagram showing typical output characteristics of the air-fuel ratio sensor and $O_2$ sensor; and, FIG. 16 is a flowchart showing another embodiment of the routine for calculating average output of the upstream air-fuel ratio sensors.

FIG. 15 shows an example of the output of the lean air-fuel ratio sensor formed by the electrodes 144a and 145a (line A), and the overall output of the air-fuel ratio sensor 140 (line B) after corrected by the output of the oxygen pump formed by the electrodes 144b and 145b, where both outputs are shown after converted to voltage signals. Also in FIG. 15, an example of output signal of the conventional $O_2$ sensor is shown for the purpose of reference (line C). As seen from FIG. 15, output voltage of the air-fuel ratio sensor (line B) is proportional to the air-fuel ratio of the exhaust gas over wide air-fuel ratio range of the exhaust gas, whereas the output voltage of the conventional $O_2$ sensor (line C) only indicates whether the air-fuel ratio of the exhaust gas is rich or lean compared to the stoichiometric air-fuel ratio. In this embodiment, air-fuel ratio sensor sensors of the type shown by FIG. 14 are used for the upstream air-fuel ratio sensors 13A and 13B, and the conventional type $O_2$ sensor which has the output characteristic shown by line C in FIG. 15 is used for the downstream $O_2$ sensor 17.

The operation of the control circuit 10 of FIG. 1 will now be explained.

In this embodiment, the control circuit 10 carries out the following operations.

(1) A first air-fuel ratio feedback control based on the outputs of the upstream air-fuel ratio sensor 13A and 13B, for controlling the air-fuel ratio of the cylinder banks A and B separately.

(2) A second air-fuel ratio feedback control based on the outputs of the downstream $O_2$ sensor 17, for correcting the first air-fuel ratio feedback control.

(3) An operation for detecting the deterioration of catalytic converter based on the outputs of the upstream air-fuel ratio sensor 13A and 13B and the downstream $O_2$ sensor 17.

Hereinafter, these operations are explained in detail with reference to the attached drawings.

(1) A first air-fuel ratio feedback control

As explained above, in the first air-fuel ratio feedback control, the air-fuel ratios of the cylinder banks A and B are controlled separately, based on the respective output signals of the upstream air-fuel ratio sensors 13A and 13B.

Figure 3A:
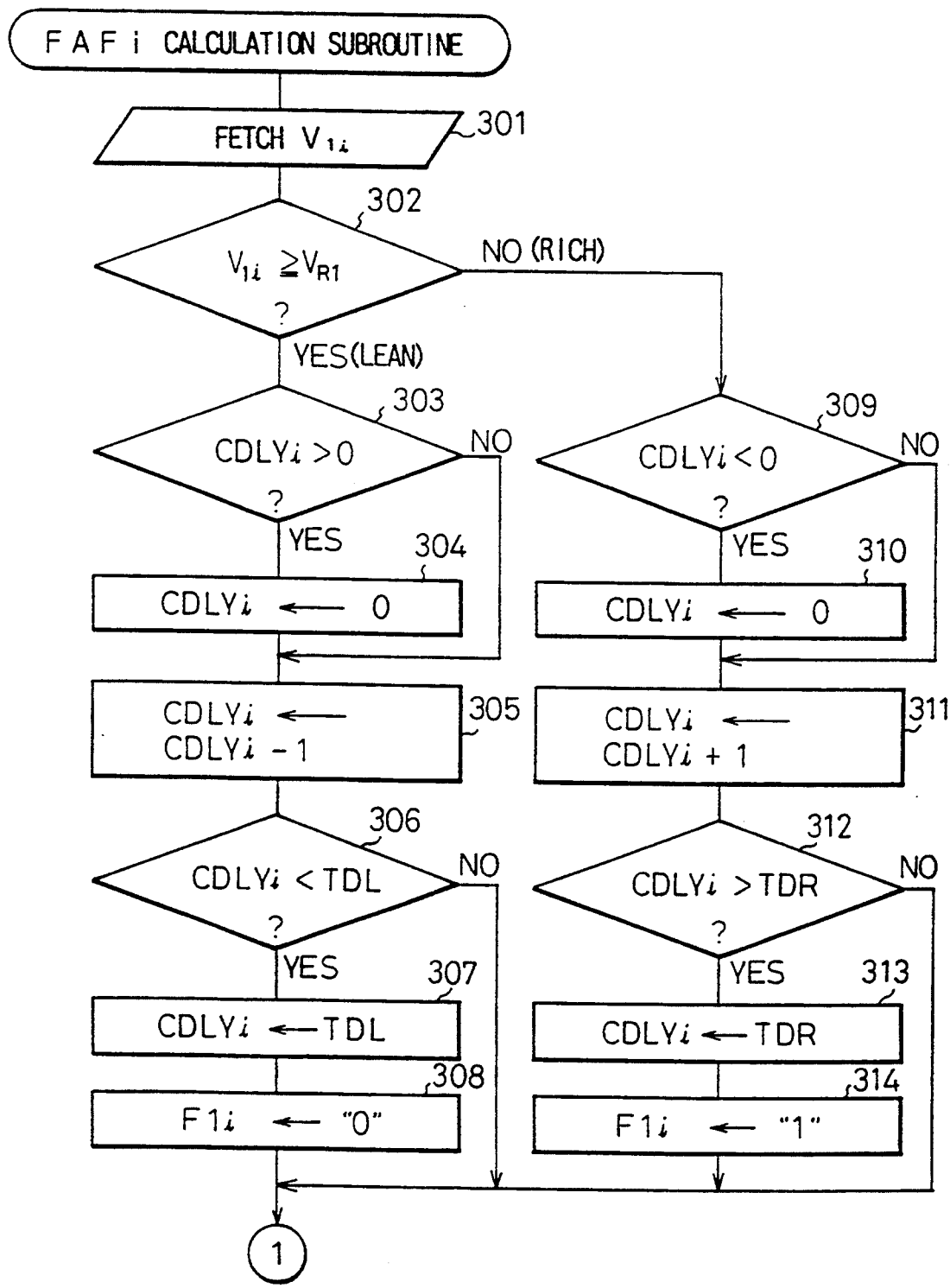
Figure 3B:
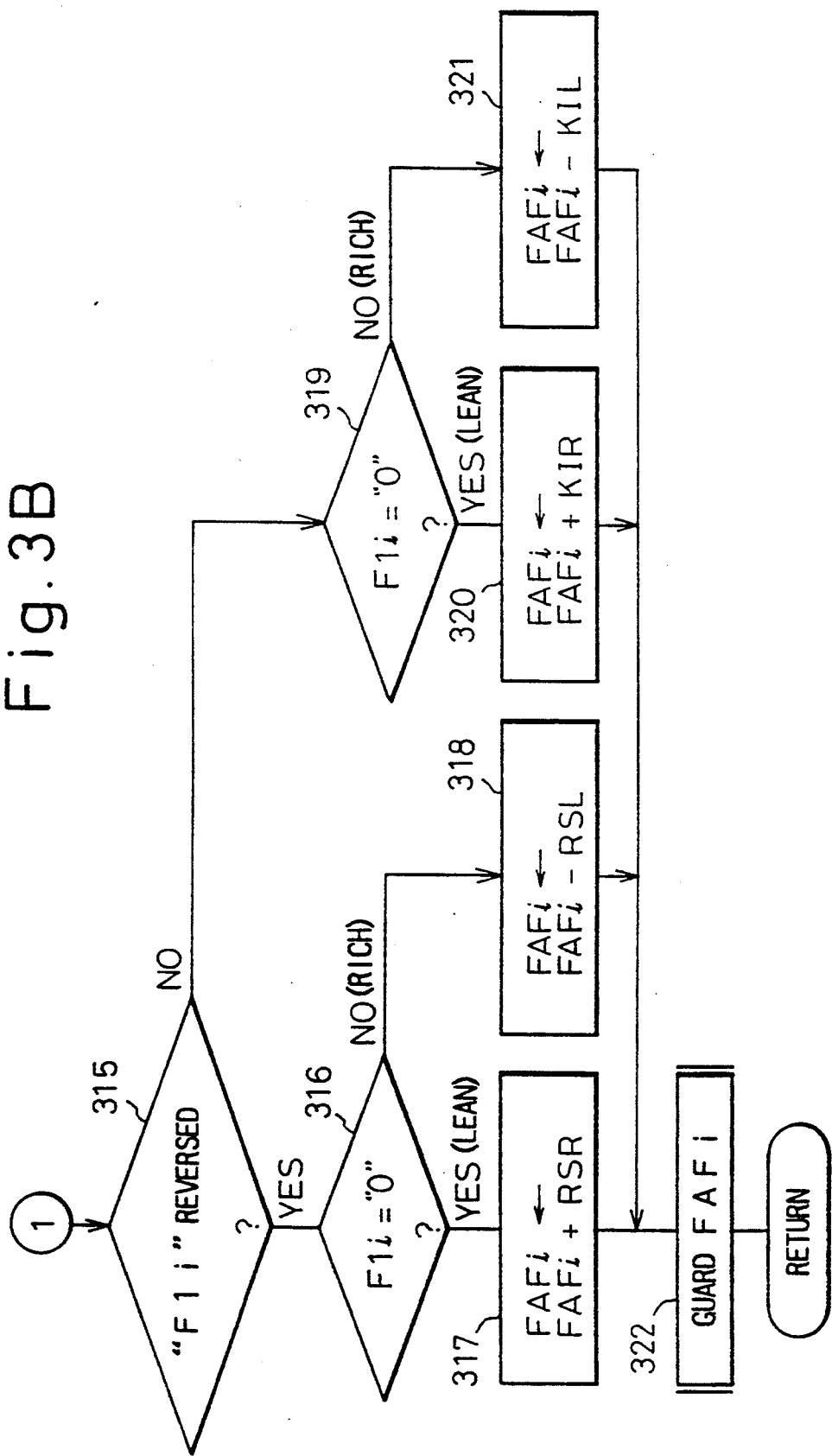

FIGS. 2, 3A and 3B are flowcharts showing routines for the first air-fuel ratio feedback control carried out by the control circuit 10.

FIG. 2 shows a routine for calculating air-fuel ratio correction factors FAFA and FAFB for cylinder banks A and B, respectively, in accordance with the outputs $V_{1A}$, $V_{1B}$ of the upstream air-fuel ratio sensors 13A and 13B. This routine is executed at predetermined intervals such as 4 ms.

When the routine starts, at step 201, it is determined whether or not all conditions for air-fuel ratio feedback control are satisfied. The conditions for a feedback control are, for example, the engine starting operation has completed (e.g., the engine speed is higher than a predetermined value.)

the coolant temperature is higher than a predetermined value, the air-fuel ratio enrichment, such as a start-up air-fuel ratio enrichment, a warming-up air-fuel ratio enrichment, a power air-fuel ratio enrichment, or an OTP air-fuel ratio enrichment for preventing excess rise in the temperature of the catalytic converters, are not being carried out, the outputs of the upstream air-fuel ratio sensors 13A, 13B, have been reversed (i.e., changed from an output voltage level corresponding to a rich air-fuel ratio to an output voltage level corresponding to a lean air-fuel ratio, or vice versa) at least once, a fuel cut operation is not being carried out.

If any of these conditions is not satisfied, the routine proceeds to step 212 which causes an air-fuel ratio feedback control flag XMFB to be zero and the routine terminates at step 213.

If all of the conditions for the feedback control are satisfied at step 201, the routine proceeds to step 202, which resets a flag XW (i.e., XW=0). The value of the flag XW shows the cylinder bank for which the air-fuel ratio correction factor is being calculated by this routine, and XW=0 designates the cylinder bank A, and XW=1 designates the cylinder bank B.

At steps 203 to 206, addressing of RAM 105 is carried out in accordance with the value of the flag XW. That is, if XW=0 at 202, parameters used in the calculation in step 207 are read from a storage area in RAM 105 which is allocated for the bank A, and the calculation results are stored in the same storage area (in this case, the suffix "i" in the subroutine executed at step 207

(FIGS. 3A and 3B) represents letter "A"). Similarly, if XW=1 at 203, the calculation in step 207 is carried out using parameters stored in a storage area allocated for the bank B in RAM 105, and the calculation results are stored in the same storage area (in this case, the suffix "i" in the subroutine of FIGS. 3A and 3B represents letter "B").

Then, at step 207, the air-fuel ratio correction factor FAFi is calculated by the subroutine of FIGS. 3A and 3B (in this case, since the flag XW has been reset (XW=0) at step 203 and the suffix "i" represents letter "A", FAFAi represents the air-fuel ratio correction factor FAFA of the bank A). After executing step 207, it is determined whether or not the value of the flag XW is 1. In this case, since the flag XW has been reset (XW=0) at step 202, the routine proceeds to step 210 to set the flag XW (i.e., XW=1).

Then steps 203 to 207 are repeated, this time, to calculate air-fuel ratio correction factor FAFB for the bank B. Then the routine proceeds from step 209 to step 211, since the flag XW has been set (XW=1) at step 210 this time. And the routine is terminated at step 213, after setting the air-fuel ratio feedback control flag XMFB to be 1 at step 211. Namely, when this routine is executed, first, the air-fuel ratio correction factor FAFA for the bank A is calculated, then, the air-fuel ratio correction factor FAFB is calculated.

FIGS. 3A and 3B show a flowchart of the subroutine executed at step 207 in FIG. 2 for calculating the air-fuel ratio correction factors FAFA and FAFB. As explained above, the suffix "i" in the flowchart represents letters "A" or "B" in accordance with the value of the flag XW.

In FIG. 3A, when the subroutine is called, an A/D conversion is performed at step 301 upon receiving the output voltage $V_{1i}$ of the upstream air-fuel ratio sensor 13$i$, and the A/D converted value thereof is then fetched from the A/D converter 101. Then, at step 302, the voltage $V_{1i}$ is compared with a reference voltage $V_{R1}$ to determine whether the current air-fuel ratio detected by the upstream air-fuel ratio sensor 13$i$ is rich or lean with respect to the stoichiometric air-fuel ratio. The reference voltage $V_{R1}$ is the output voltage of the upstream air-fuel ratio sensor when the air-fuel ratio of the exhaust gas is stoichiometric.

If $V_{1i} \geq V_{R1}$, which means that the current air-fuel ratio is lean, the control proceeds to step 303, at which it is determined whether or not the value of a delay counter CDLYi is positive. If CDLYi>0, the control proceeds to step 304, which clears the delay counter CDLYi, and then proceeds to step 305. At step 305, the delay counter CDLYi is counted down by 1, and at step 306, it is determined whether or not CDLYi<TDL. Note that TDL is a lean delay time for which a rich state is maintained even after the output of the upstream air-fuel ratio sensor 13$i$ changes from rich to lean, and is defined by a negative value. At step 306, only when CDLYi<TDL does the control proceed to step 307, which causes CDLYi to be changed to TDL, and then to step 308, which causes an air-fuel ratio flag F1i to be reset to zero (lean state). On the other hand, if $V_{1i}<V_{R1}$ at step 302, which means that the current air-fuel ratio is rich, the control proceeds to step 309, which determines whether or not the value of the delay counter CDLYi is negative. If CDLYi<0, the control proceeds to step 310, which clears the delay counter CDLYi, and then proceeds to step 311. If CDLYi≧0, the control directly proceeds to step 311. At step 311, the delay counter CDLYi is counted up by 1, and at step 312, it is determined whether or not CDLYi>TDR. Note that TDR is a rich delay time for which a lean state is maintained even after the output of the upstream air-fuel ratio sensor 13$i$ changes from lean to rich, and is defined by a positive value. At step 312, only when CDLYi>TDR does the control proceed to step 313, which causes CDLYi to be changed to TDR, and then proceeds to step 314, which causes an air-fuel ratio flag F1 to be set to 1 (rich state).

Then, at step 315 in FIG. 3B, it is determined whether or not the air-fuel ratio flag F1i has changed, i.e., whether or not the delayed air-fuel ratio detected by the upstream air-fuel ratio sensor 13$i$ has changed. If the air-fuel ratio flag F1i has changed, the control proceeds to steps 316 to 318, and a skip operation is carried out. That is, if the flag F1i is reset to zero (lean) at step 316, the control proceeds to step 317, which increases the correction factor FAFi by a skip amount RSR.

If the flag F1 is set to 1 (rich) at step 316, the control proceeds to step 318, which reduces the correction factor FAFi by a skip amount RSL.

If the air-fuel ratio flag F1i has not changed at step 315, the control proceeds to steps 319 to 321, which carry out an integration operation. That is, if the flag F1i is reset to zero (lean) at step 319, the control proceeds to step 320, which gradually increases the correction factor FAFi by a rich integration amount KIR. Also, if the flag F1i is set to 1 (rich) at step 319, the control proceeds to step 321, which gradually decreases the correction factor FAFi by a lean integration amount KIL.

Then, at step 322, the air-fuel ratio correction factor FAFi is guarded by (i.e., restricted to), for example, a minimum value of 0.8 and a maximum value of 1.2, thereby preventing the controlled air-fuel ratio from becoming overrich or overlean.

The correction factor FAFi is then stored in the RAM 105 and the subroutine terminates.

As explained above, the subroutine in FIGS. 3A and 3B is executed for the cylinder bank A and the cylinder bank B alternately. Consequently, the air-fuel ratio correction factors FAFA and FAFB are calculated separately to perform air-fuel ratio control of cylinder bank A and B independently.

The control operation shown in the flowcharts of FIGS. 3A and 3B are further explained with reference to FIGS. 4, A through D. FIGS. 4A through 4D are timing diagrams showing changes of various parameters in the air-fuel ratio control of the cylinder bank A by the flowchart of FIGS. 3A and 3B. Though FIGS. 4A through 4D show the diagrams for cylinder bank A, they can be applied to the cylinder bank B.

As illustrated in FIG. 4A, when the air-fuel ratio signal A/F is obtained by the output of the upstream air-fuel ratio sensor 13A, the delay counter CDLYA is counted up when the upstream air-fuel ratio sensor 13A indicates a rich air-fuel ratio, and is counted down when it indicates a lean air-fuel ratio, as illustrated in FIG. 4B. As a result, a delayed air-fuel ratio corresponding to the air-fuel ratio flag F1A is obtained as illustrated in FIG. 4C.

For example, at time $t_1$, even when the air-fuel ratio A/F changes from lean to rich, the delayed air-fuel ratio A/F' (F1A) changes at time $t_2$ after the rich delay time TDR. Similarly, at time $t_3$, even when the air-fuel ratio A/F changes from rich to lean, the delayed air-fuel ratio A/F' (F1A) changes at time $t_4$ after the lean delay time TDl. At time $t_5$, $t_6$, or $t_7$, however, when the air-fuel ratio A/F is reversed in a shorter time than the rich delay time TDR or the lean delay time TDL, the delayed air-fuel ratio F1A is reversed at time $t_8$. That is, the delayed air-fuel ratio A/F' (F1A) is stable when compared with the air-fuel ratio A/F.

(2) A second air-fuel ratio control

Next, the air-fuel ratio feedback control based on the output of the downstream $O_2$ sensor 17 is explained.

Generally, three types of air-fuel ratio feedback control operations by the downstream $O_2$ sensor 17 are used, i.e., the operation type in which one or more of the parameters such as the skip amount RSR, RSL, integration amounts KIR, KIL and delay times TDR, TDL are adjusted in accordance with the output of the downstream $O_2$ sensor 17, the operation type in which thereference voltage $V_{R1}$ for the outputs $V_{1A}$, $V_{1B}$ of the upstream air-fuel ratio sensors 13A, 13B are adjusted in accordance with the output of the downstream $O_2$ sensor 17, and the operation type in which a second air-fuel ratio correction factor FAF2, which is calculated based on the output of the downstream $O_2$ sensor 17, is introduced.

For example, if the rich skip amount RSR is increased, or if the lean skip amount RSL is decreased, the controlled air-fuel ratio becomes richer, and if the lean skip amount RSL is increased or if the rich skip amount RSR is decreased, the controlled air-fuel ratio becomes leaner. Thus, the air-fuel ratio can be controlled by changing the rich skip amount RSR and the lean skip amount RSL in accordance with the output of the downstream $O_2$ sensor 17.

Further, if the rich integration amount KIR is increased or if the lean integration amount KIL is decreased, the controlled air-fuel ratio becomes richer, and if the lean integration amount KIL is increased or if the rich integration amount KIR is decreased, the controlled air-fuel ratio becomes leaner. Thus, the air-fuel ratio can be controlled by changing the rich integration amount KIR and the lean integration amount KIL in accordance with the output of the downstream $O_2$ sensor 17.

Further, if the reference voltage $V_{R1}$ is increased, the controlled air-fuel ratio becomes richer, and if the reference voltage $V_{R1}$ is decreased, the controlled air-fuel ratio becomes leaner. Thus, the air-fuel ratio can be controlled by changing the reference voltage $V_{R1}$ in accordance with the output of the downstream $O_2$ sensor 17.

Also, if the rich delay time becomes longer than the lean delay time (i.e., TDR>TDL), the controlled air-fuel ratio becomes richer, and if the lean delay time becomes longer than the rich delay time (i.e., TDL>TDR), the controlled air-fuel ratio becomes leaner. Thus, the air-fuel ratio can be controlled by changing the rich delay time TDR and the lean delay time TDL in accordance with the output of the downstream $O_2$ sensor 17.

These types of air-fuel ratio control operations have respective advantages. For example, if the delay times TDR, TDL are adjusted, a precise control of the air-fuel ratio can be obtained, and if the skip amounts RSR, RSL are adjusted, the response of the control is improved. Naturally, two or more of these types of operation can be used at the same time.

Figure 5B:
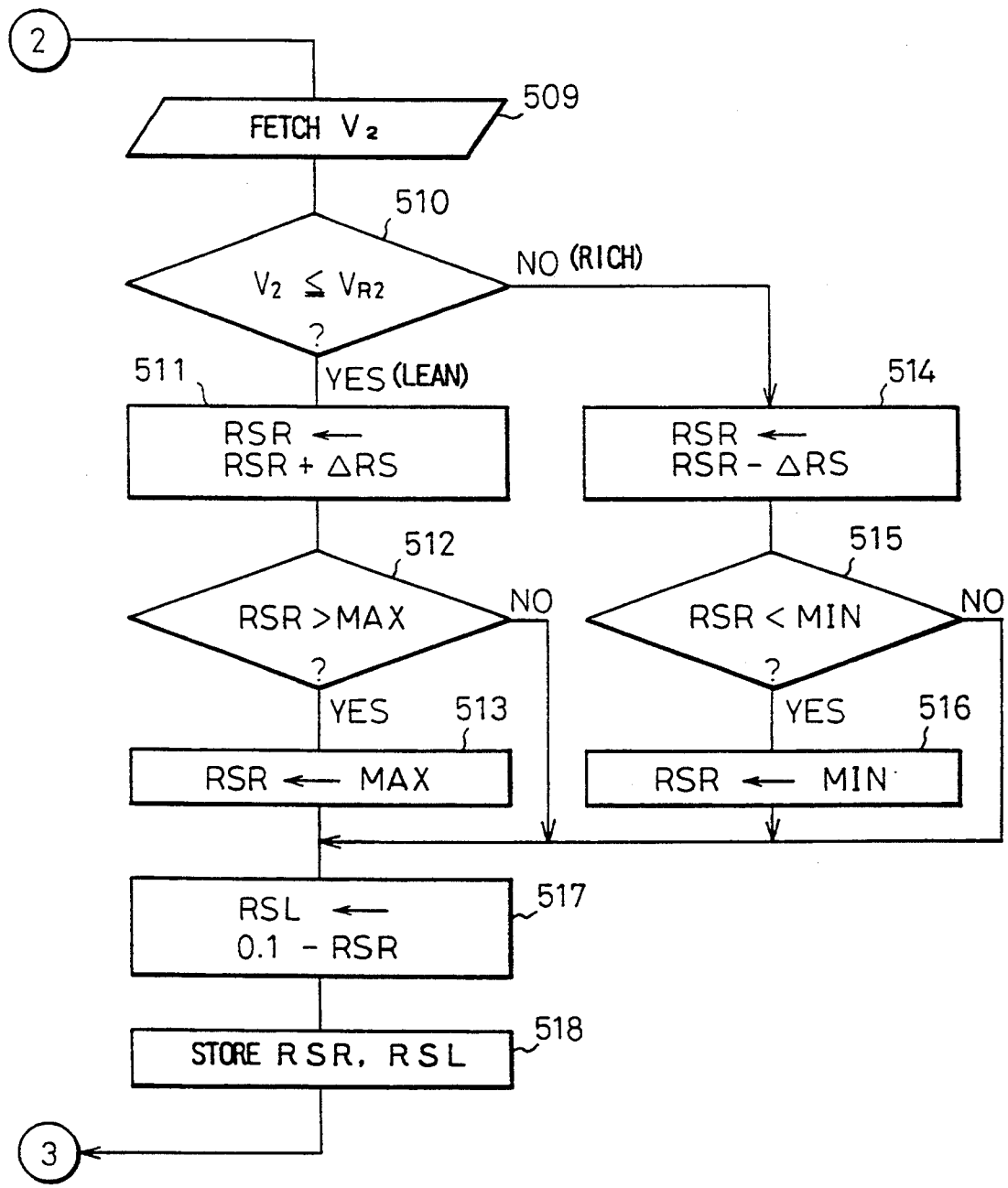

FIGS. 5A and 5B show a flowchart of the control operation of the double $O_2$ sensor system of the present embodiment in which the skip amounts RSR, RSL are adjusted in accordance with the output $V_2$ of the downstream $O_2$ sensor 17. This routine is executed at predetermined intervals of, e.g., 512 ms.

The steps from 501 to 506 of FIG. 5A show the operation for determining whether or not the conditions for executing the feedback control based on the output of the downstream $O_2$ sensor 17 are satisfied.

These conditions are, the conditions for executing the air-fuel ratio feedback control based on the output of the upstream air-fuel ratio sensors 13A, 13B are satisfied (the air-fuel ratio feedback control flag XMFB=1 at step 501), the temperature THW of the coolant is higher than a predetermined value (e.g., 70° C.), (step 502), the throttle valve 18 is not fully closed (i.e., the signal LL is not ON), (step 503), secondary air AS is not being introduced into the exhaust manifold, (step 504), the load of the engine represented by Q/Ne is more than a predetermined value $X_1$ (i.e., Q/Ne$\geq X_1$), (step 505), the downstream $O_2$ sensor 17 is activated (step 506).

If any of these conditions are not satisfied, the routine proceeds to step 519 in which an air-fuel ratio feedback control flag XSFB is reset (=0).

If all of the conditions of steps 501 to 506 are satisfied, the flag XSFB is set (=1) at step 508, and the routine proceeds to step 509 of FIG. 5B.

The steps 509 through 518 illustrate the operation for calculating the skip amounts RSR or RSL in accordance with the output $V_2$ of the downstream $O_2$ sensor 17.

At step 509, an A/D conversion is performed on the output voltage $V_2$ of the downstream $O_2$ sensor 17, and the A/D converted value thereof is then fetched from the A/D converter 101.

Then at step 510, the voltage $V_2$ is compared with a reference voltage $V_{R2}$, to determine whether the current air-fuel ratio detected by the downstream $O_2$ sensor 17 is rich or lean with respect to the stoichiometric air-fuel ratio. The reference voltage $V_{R2}$ is usually set at or near the center value of the maximum output of the $O_2$ sensor and, in this embodiment, $V_{R2}$ is set at approximately 0.45 V.

If $V_2 \leq V_{R2}$ (lean state) at step 510, then the routine proceeds to steps 511 to 513, and if $V_2 > V_{R2}$ (rich state), the routine proceeds to steps 514 to 516. Namely, at step 511, the rich skip amount RSR is increased by $\Delta$ RS (constant value), to thereby make the air-fuel ratio to rich.

Then, at steps 512 and 513, the rich skip amount RSR is guarded by a maximum value MAX (e.g., approximately 0.075). On the other hand, at step 514, the rich skip amount is decreased by $\Delta$ RS, to thereby make the air-fuel ratio lean. Then, at steps 515 and 516, the rich skip amount RSR is guarded by a minimum value MIN (e.g., approximately 0.025). The maximum value MAX is selected so that the amount of change of the air-fuel ratio is maintained within a range that does not reduce driveability, and the minimum value MIN is selected so that the response of the control in a transient condition is not reduced.

At step 517, the lean skip amount RSL is calculated by $$RSL = 0.1 - RSR$$

Namely, the sum of RSR and RSL is maintained at 0.1. Then at step 518, the skip amounts RSR and RSL are stored in the backup RAM 106, and the routine terminates at step 520 in FIG. 5A.

Figure 6:
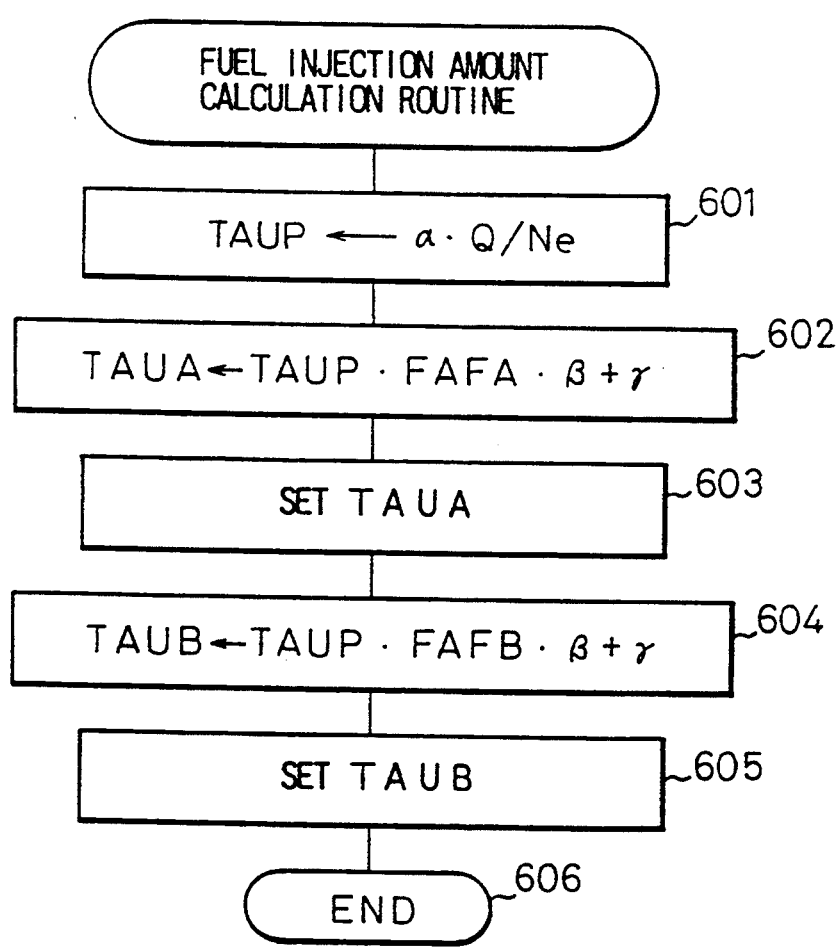

FIG. 6 shows a routine for calculating the fuel injection amount using the air-fuel ratio correction factors FAFA and FAFB calculated by the routine of FIGS. 3A and 3B.

At step 601, a basic fuel injection amount TAUP is calculated in accordance with the amount of the inlet air per one revolution of the engine, Q/Ne, by $$TAUP = \alpha \cdot Q/Ne$$

where, TAUP is the fuel injection amount required to obtain a stoichiometric air-fuel ratio and $\alpha$ is a predetermined constant.

Then, at step 602, a fuel injection amount TAUA for cylinder bank A is calculated by $$TAUA = TAUP \cdot FAFA \cdot \beta + \gamma$$

where, $\beta$ and $\gamma$ are correction factors determined by operating conditions of the engine. The calculated TAU is set into the down counter 108A of the cylinder bank A and a flip-flop 109A is set, at step 603, whereby fuel injection is started in the cylinder bank A. Similarly, at step 604, 605, a fuel injection amount TAUB for the cylinder bank B is calculated and set into the down counter 108B for the cylinder bank B, whereby fuel injection is started in the cylinder bank B.

As stated before, when the time corresponding to TAUA or TAUB has lapsed, the flip-flop 109A or 109B is reset by the signal from the down counter 108A or 108B, whereby the fuel injection is terminated.

The constants $\alpha$, $\beta$, $\gamma$ in steps 601, 602, 604 can be set at different values for cylinder banks A and B.

(3) A detecting operation of the catalyst deterioration based on the outputs of the upstream air-fuel ratio sensors 13A, 13B and the downstream $O_2$ sensor 17.

Next, the detecting operation of deterioration of the catalytic converter performed by the control circuit 10 is explained.

As explained above, the air-fuel ratios of the cylinder banks A and B are separately feedback controlled in this embodiment, and the air-fuel ratio of the exhaust gas after being mixed at the junction portion 150 of the individual exhaust passage does not correspond to either of the outputs of the upstream air-fuel ratio sensors 13A and 13B. Therefore, the method for detecting the deterioration of the catalyst such as disclosed in the copending U.S. patent application Ser. No. 957,041 (based on the lengths and areas of the output response curves of the air-fuel ratio sensors) cannot be applied to this case. However, in this embodiment, the air-fuel ratio of the exhaust gas after being mixed at the junction point 150, i.e., actual air-fuel ratio of the exhaust gas flowing into the catalytic converter 16 is estimated from the outputs of the upstream air-fuel ratio sensor, and the method in the copending U.S. patent application Ser. No. 957,041 is applied to detect the deterioration of the cayalyst using said estimated air-fuel ratio.

The air-fuel ratio of the exhaust gas after being mixed at junction portion 150 (hereinafter called "upstream air-fuel ratio") can be estimated by calculating the average value of the outputs $V_{1A}$ and $V_{1B}$ of the upstream air-fuel ratio sensor 13A and 13B.

Since the exhaust gases from the cylinder banks A and B are mixed at the junction portion 150, the air-fuel ratio of the mixed exhaust gas, i.e., upstream air-fuel ratio becomes the average of the air-fuel ratios of th exhaust gases from cylinder banks A and B. As shown in FIG. 15, the upstream air-fuel ratio sensor 13A and 13B generate output voltage signals proportional to the air-fuel ratios of the exhaust gases of the cylinder banks A and B. Therefore, if an air-fuel ratio sensor of the same type as the sensors 13A and 13B is installed at the junction portion 150, the output voltage of such sensor (i.e., upstream air-fuel ratio) should become the average value $(V_{1A}+V_{1B})/2$ of the outputs of the sensors 13A and 13B.

FIGS. 7A and 7B illustrate the typical response curves of outputs $V_{1A}$ and $V_{1B}$ of the sensors 13A and 13B, and FIG. 7C shows the response curve of the average value $V_{1M}$ thereof. Since the outputs $V_{1A}$ and $V_{1B}$ are proportional to the air-fuel ratio of the exhaust gases of the cylinder banks A and B, the average value $V_{1M}$ (hereinafter called "average output") corresponds to the average air-fuel ratio of the exhaust gases of the cylinder banks A and B, regardless of whether the air-fuel ratio feedback control of both cylinder banks are synchronized (period I in FIGS. 7A through 7C) or not synchronized (period II in FIGS. 7A through 7C). FIG. 7D shows the response curve of the output $V_2$ of the downstream $O_2$ sensor 17 corresponding to the air-fuel ratio response curves in FIGS. 7A and 7B when the catalyst 16 has deteriorated. As seen from FIGS. 7C and 7D, when the catalyst has deteriorated, the response curve of the output $V_2$ of the downstream $O_2$ sensor 17 (FIG. 7D) becomes similar to the response of the average output $V_{1M}$ (FIG. 7D).

FIGS. 8A through 8D illustrate response curves similar to FIGS. 7A through 7D, but in this case the conventional $O_2$ sensors of the type same as the sensor 17 are used for the sensor 13A and 13B instead of air-fuel ratio sensors. Since the output voltage of the conventional $O_2$ sensor changes abruptly near the stoichiometric air-fuel ratio as shown by line C in FIG. 15, the output voltage is not proportional to the air-fuel ratio. Consequently, the average output $V_{1M}$ (solid line in FIG. 8C) does not correspond to the actual upstream air-fuel ratio(dotted line in FIG. 8C) unless the air-fuel ratio feedback control of both cylinder banks A and B are synchronized (period I in FIGS. 8A through 8C).

Further, when the catalyst 16 has deteriorated, if the response curve of the actual upstream air-fuel ratio fluctuates only either on the rich air-fuel ratio side or on the lean air-fuel ratio side and does not cross the stoichiometric air-fuel ratio line, the output of the downstream $O_2$ sensor 17 (which has output characteristic shown by line C in FIG. 15) becomes constant rich state signal or constant lean signal as shown in FIG. 8D. If the method in the copending U.S. patent application Ser. No. 957,041 is applied to such cases, the ratio of lengths of the response curves of the average output $V_2$ and $V_{1M}$ of the downstream $O_2$ sensor and upstream $O_2$ sensor respectively, becomes smaller than actual value, and the ratio of the areas thereof becomes larger than actual value. In this case, the condition of the catalyst may be determined as the point A on the map shown by FIG. 13, though the actual condition is point A' on the same map. Namely, a deteriorated catalyst may be incorrectly determined as being normal. According to the present invention such an error can be prevented.

Figure 9:
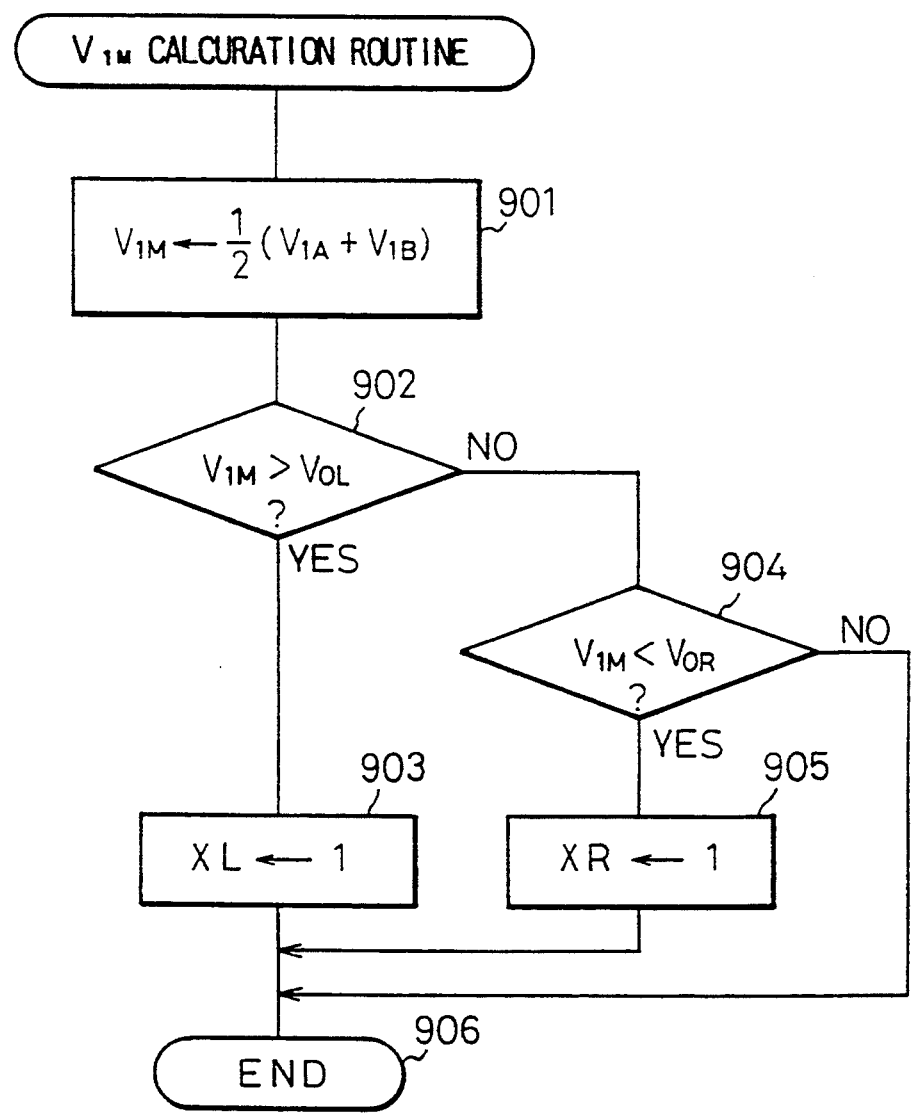
FIG. 9 is a flowchart showing an embodiment of the routine for calculating the average output of the upstream air-fuel ratio sensors.
Figure 10A:
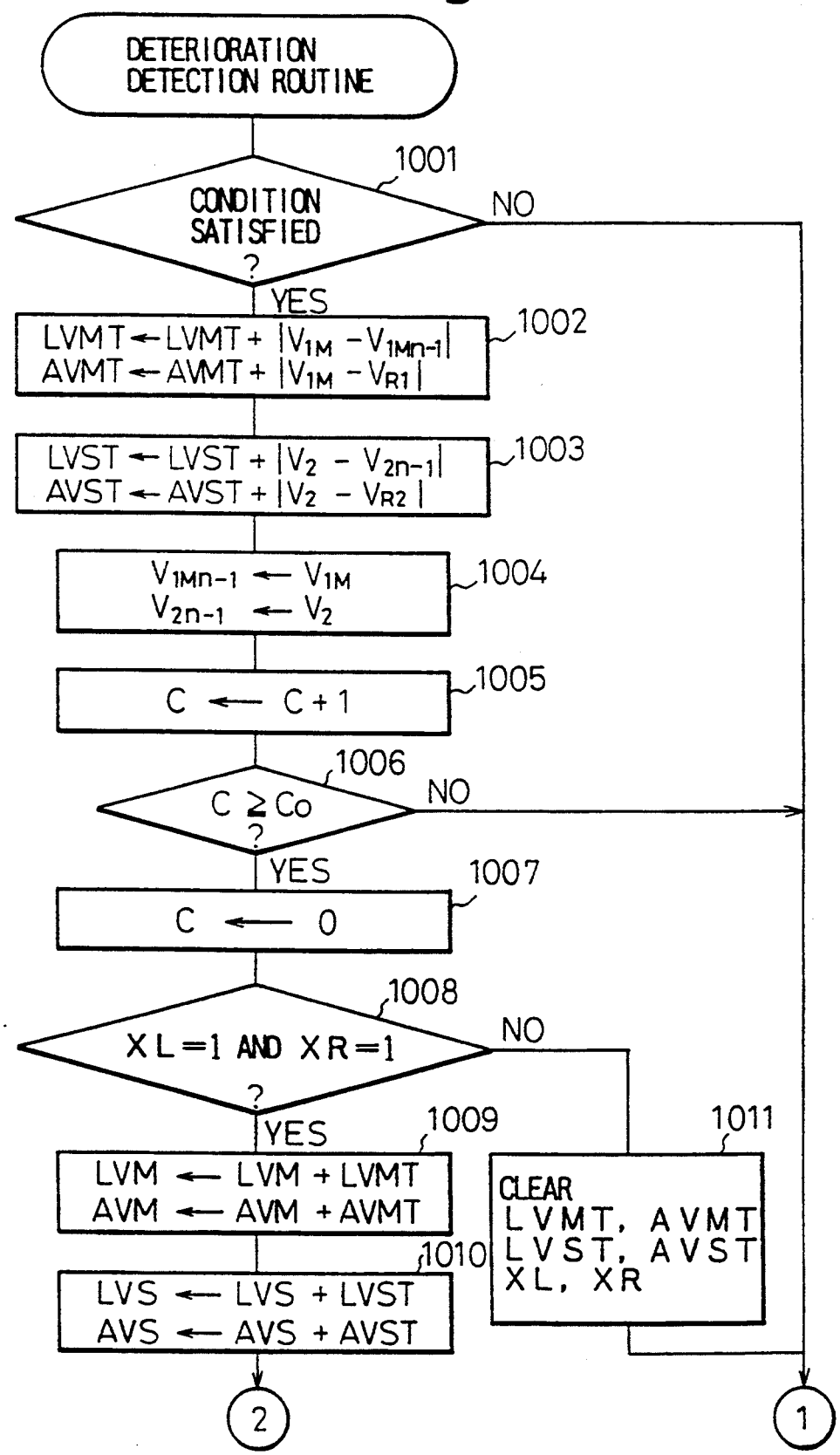
FIGS. 10A and 10B are flowchart showing an embodiment of the routine for detecting the deterioration of the catalytic converter.
Figure 10B:
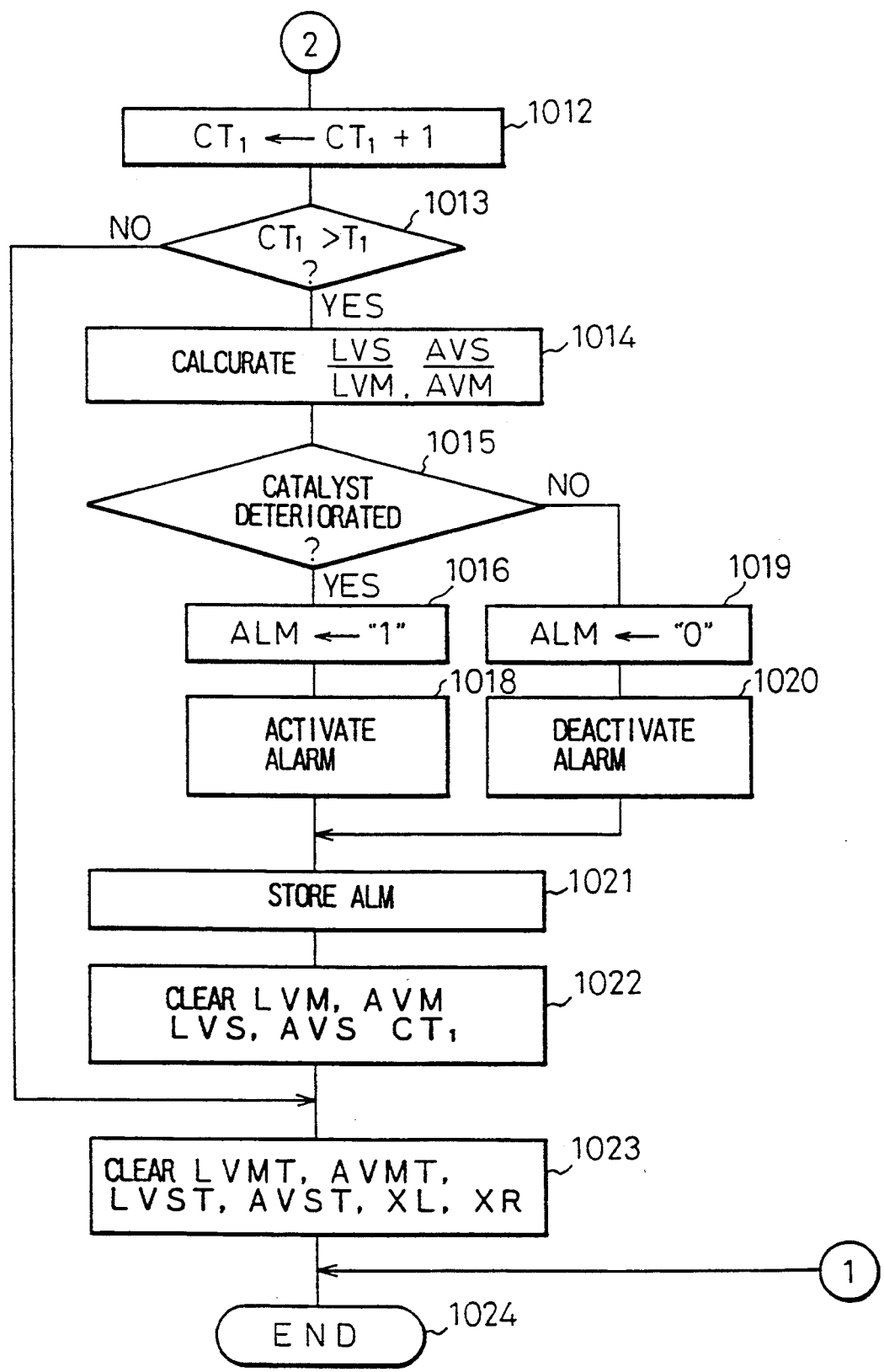

FIGS. 9 and 10A, 10B show flow charts of the routines for detecting a deterioration of the catalyst carried out by the control circuit 10.

In the routine in FIG. 9, the average output $V_{1M}$ is calculated, and further, the range of the fluctuation thereof is determined. Namely, when the routine starts, the average output of the upstream air-fuel ratio sensors 13A and 13B is calculated at step 901 by, $$V_{1M} = (\tfrac{1}{2}) \cdot (V_{1A} + V_{1B})$$

and the calculated $V_{1M}$ is stored in the RAM 105 of the control circuit 10.

Then, at step 902, it is determined whether or not the calculated $V_{1M}$ is larger than a predetermined value $V_{OL}$. If $V_{1M}$ is larger than $V_{OL}$ at step 902, the routine proceeds to step 903 which causes a flag XL to be set to 1. If $V_{1M}$ is not larger than $V_{OL}$ at step 902, then at step 904, it is determined whether or not the calculated $V_{1M}$ is smaller than a predetermined value $V_{OR}$. If $V_{1M}$ is smaller than $V_{OR}$, a flag XR is set to 1 at step 905, and if $V_{1M}$ is not smaller than $V_{OR}$, the routine terminates at step 1206 without changing the values of the flags XL and XR.

By this routine, only when the fluctuation of the average output $V_{1M}$ exceeds the range between $V_{OL}$ and $V_{OR}$, are both of the flags XL and XR set to 1.

Figure 13:
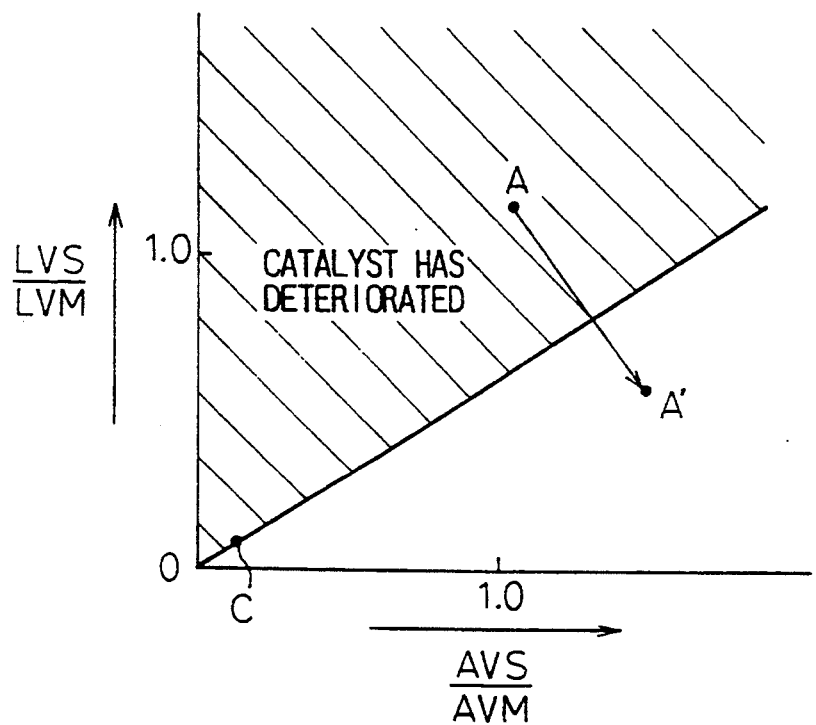
FIGS. 13 is an example of the map used for detecting the deterioration of the catalytic converter in the embodiment of FIGS. 10A and 10B.

When the upstream air-fuel ratio continues to stay near the stoichiometric air-fuel ratio and does not fluctuate the output $V_2$ of the downstream $O_2$ sensor stays near the stoichiometric air-fuel ratio regardless of the deterioration of the catalyst. This causes the ratio of the lengths and the ratio of the areas to be very small. In this case, the condition of the catalyst on the map in FIG. 13 is indicated, for example, by point C. This makes it difficult to determine whether or not the catalyst is deteriorated. Thererfore, to avoid the error in the detection, it is favorable to carry out the detection of the catalyst deterioration only when the average output $V_{1M}$ fluctuates over an appropriate air-fuel ratio range. In this embodiment, the flags XL and XR are set to be 1 when the range of the fluctuation of the average output $V_{1M}$ exceeds a predetermined range. In this embodiment, the predetermined values $V_{OL}$ and $V_{OR}$ are selected so that, for example, $V_{OL}$ corresponds to the air-fuel ratio of 15.0 and $V_{OR}$ corresponds to the air-fuel ratio of 14.0.

FIGS. 10A and 10B show a flow chart of the routine for determining whether or not the catalyst has deteriorated. This routine is executed at predetermined intervals (e.g., 65 ms).

In this routine, the lengths and areas of the response curves of the average output $V_{1M}$ of upstream air-fuel ratio sensors 13A and 13B and the output $V_2$ downstream $O_2$ sensor 17 are calculated provisionally evey time the routine is executed, and stored in RAM 105 as variables named LVMT, LVST, AVMT, AVST, respectively. These lengths LVMT, LVST, and areas AVMT, AVST, provisionally calculated, are added to variables LVM, LVS, and AVM, AVS, respectively only when the fluctuation of the average output $V_{1M}$ exceeds the range $V_{OL}$ and $V_{OR}$ within a predetermined period. With the cumulated values of the lengths LVM, LVS and the areas AVM, AVS, the ratio of the lengths (LVS/LVM) and the ratio of the areas (AVS/AVM) explained before are calculated, and the deterioration of the catalyst is determined from these ratios LVS/LVM and AVS/AVM based on the map shown in FIG. 13.

Namely, when the routine starts in FIG. 10A, it is determined at step 1001 whether or not the conditions for executing the detecting operation of the catalyst deterioration are satisfied. These conditions are, for example, the first air-fuel ratio feedback control based on the outputs of the upstream air-fuel ratio sensors 13A and 13B is being carried out (i.e., the flag XMFB in FIG. 2 is set to 1), and the second air-fuel ratio feedback control based on the output of the downstream $O_2$ sensor 17 is being carried out (i.e., the flag XFSB in FIG. 5A is set to 1).

If these conditions are not satisfied, the routine terminates immediately at step 1023 in FIG. 10B.

If the conditions are satisfied at step 1001, then the provisional values of the length LVMT, and the area AVMT are calculated at step 1002.

Figure 11:
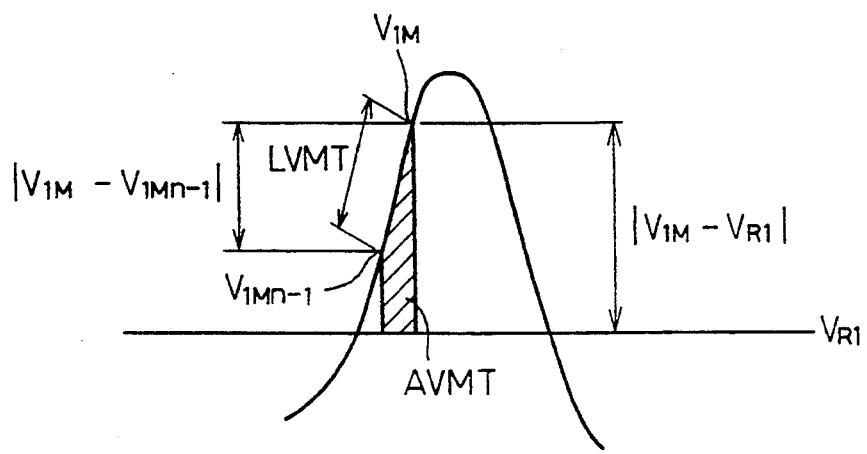
FIG. 11 is a diagram explaining the length and the area of the output signal response curve of the $O_2$ sensor.

The length LVMT and area AVMT used in this embodiment are schematically illustrated in FIG. 11.

As seen from FIG. 11, LVMT, which is the length of the response curve of the average output $V_{1M}$ of the upstream air-fuel ratio sensors is calculated by, $$LVMT = LVMT + |V_{1M} - V_{1Mn-1}|$$

and,

AVMT, which is the area bounded by the response curve of the average output $V_{1M}$ of the upstream air-fuel ratio sensors and the reference output value thereof, is calculated by, $$AVMT = AVMT + |V_{1M} - V_{R1}|$$

where, $V_{1Mn-1}$ is the value of the average output $V_{1M}$ when the routine was last executed, and $V_{R1}$ is the reference output voltage of the upstream air-fuel ratio sensor which corresponds to, for example, the stoichiometric air-fuel ratio.

Then, the length LVST of the response curve of the output $V_2$ of the downstream $O_2$ sensor 17, and the area AVST bounded by the response curve of the output voltage $V_2$ and the reference voltage $V_{R2}$ thereof are calculated at step 1002 in the similar manner by, $$LVST = LVST + |V_2 - V_{2n-1}|$$

and $$AVST = AVST + |V_2 - V_{R2}|$$

where, $V_{2n-1}$ is the value of the output $V_2$ when the routine was last executed.

After calculating the provisional lengths and the areas, the values $V_{1Mn-1}$ and $V_{2n-1}$ are updated at step 1004, to prepare for the next execution of the routine.

Then the routine proceeds to steps 1005 to 1008 which determine whether the range of the fluctuation of the average output $V_{1M}$ exceeds the range $V_{OL}$ and $V_{OR}$ (i.e., whether the flags XL and XR are both 1) within a predetermined time (for example, 1 second). In FIG. 10A "C" in steps 1005 and 1006 is a counter used for measuring time, and "$C_O$" in step 1006 is a counter for the number of the execution of tile routine per second. If the average output $V_{1M}$ did not fluctuate over the range $V_{OL}$ and $V_{OR}$, i.e., if either of the flags XL and XR is not 1 at step 1008, since these values are not appropriate for the determination of the catalyst deterioration, the values LVMT, LVST, and AVMT, AVST calculated provisionally are cleared at step 1011, and the routine terminates at step 1024 in FIG. 10B.

On the contrary, if both flags are 1 at step 1008, i.e., if the range of the fluctuation of the average output $V_{1M}$ are enough, then the provisional values LVMT, LVST, and AVMT, AVST are added to the values LVM, LVS, and AVM, AVS, respectively at steps 1009 and 1010. LVM, LVS, and AVM, AVS are the values used as the lengths and the areas of the response curves for the detection of the deterioration of the catalyst.

Steps 1012 through 1020 in FIG. 10B show the operation for detecting the deterioration of the catalyst based on the method disclosed in the copending U.S. patent application Ser. No. 957,041. The principal of the method is explained with reference to FIGS. 12A through 12C.

Figure 12A:
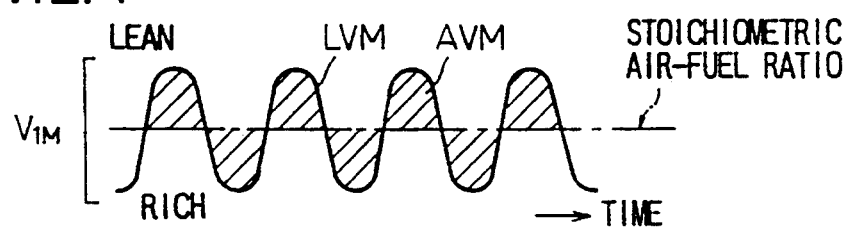
FIGS. 12A through 12C schematically show the output signal response curves of the average output of the upstream air-fuel ratio sensors and the downstream $O_2$ sensor before and after the catalytic converter has deteriorated.
Figure 12B:
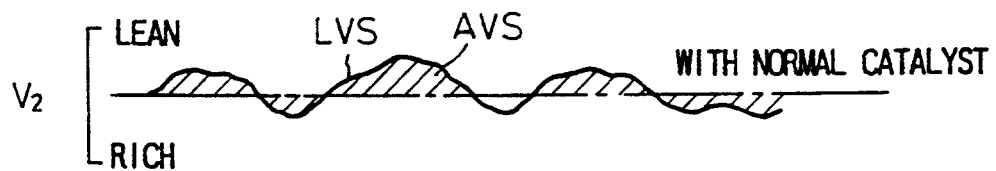
Figure 12C:
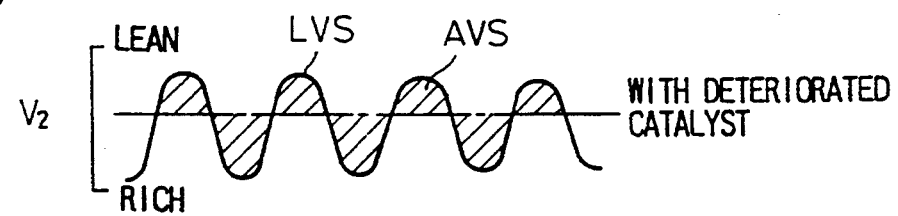

FIG. 12A illustrates the response curve of the average output $V_{1M}$ of the upstream air-fuel ratio sensors, and FIGS. 12B and 12C illustrate the output of the downstream $O_2$ sensor corresponding to the response curve of FIG. 12A when the catalyst is normal (FIG. 12B) and when the catalyst has deteriorated (FIG. 12C). As seen from FIG. 12B, when the catalyst is normal, the length LVS of the response curve of the output of the downstream $O_2$ sensor is relatively small, and the area AVS thereof is relatively large. On the contrary, when the catalyst has deteriorated, the length LVS becomes relatively large, and the area AVS becomes relatively small, as shown in FIG. 12C. Therefore, when the catalyst has deteriorated, the relationship of the ratios LVS/LVM and AVS/AVM falls in the hatched area in the map shown by FIG. 13, and the deterioration of the catalyst can be detected from the map shown by FIG. 13.

At step 1012 in FIG. 10B, a counter $CT_1$ is increased by 1, and at step 1013, it is determined whether or not the value of the counter $CT_1$ exceeds a predetermined value $T_1$ where the value $T_1$ is set to about 20. Namely, in this embodiment, the determination of the deterioration of the catalyst is carried out when the period $C_1$ in which fluctuation of the average output $V_{1M}$ exceeds the range $V_{OL}$ and $V_{OR}$ (steps 1005 through 1008 in FIG. 10A) occurs 20 times. This corresponds to a cumulative time of 20 seconds. If $CT_1$ is more than $T_1$ at step 1013, the ratio of the lengths (LVS/LVM) and the ratio of the areas (AVS/AVM) are calculated at step 1014. Then, at step 1015, it is determined whether or not the catalyst has deteriorated, based on the map in FIG. 13 using the ratios of the lengths and the areas (LVS/LVM and AVS/AVM).

If it is determined that the catalyst has deteriorated at step 1015, the routine proceeds to step 1016, which causes an alarm flag ALM to be 1, and step 1018, which activates an alarm (not shown in FIG. 1) to warn the driver. If it is determined that the catalyst is not deteriorated at step 1015, the alarm flag ALM is reset (=0) at step 1019, and the alarm is deactivated at step 1020. In both cases, the value of the alarm flag ALM is stored in the backup RAM at step 1021 to prepare for future maintenance and inspection.

After executing above steps, the variables LVM, AVM. LVS, AVS, and the counter $CT_1$ are cleared (i.e., =0) at step 1022, and the variables LVMT, LVST, AVMT, AVST, and the flags XL, XR are cleared at step 1023, then the routine is terminated at step 1024.

Another embodiment of the operation for estimating the average air-fuel ratio of the exhaust gas mixed at junction portion will now be explained.

In the embodiments explained above, it is assumed that the air-fuel ratio of the exhaust gas mixed at the junction portion 150 (FIG. 1) is the average of the air-fuel ratios detected at the same time by the upstream air-fuel ratio sensors 13A and 13B. This assumption is valid if the lengths of the individual exhaust passages between the positions of the upstream air-fuel ratio sensors and the junction portion 150 are the same. However, in some cases, the length between the upstream air-fuel ratio sensor and the junction portion are substantially different in the respective individual exhaust passages. In such a case, the average of the air-fuel ratio detected by the upstream air-fuel ratio sensor does not coincide with actual air-fuel ratio of the exhaust gas at junction portion. Therefore, when the lengths of the respective individual exhaust passages between the positions and the junction portion are substantially different, it is preferable to consider the difference in the time for the exhaust gas travelling the distance between the upstream air-fuel ratio sensor and the junction portion.

In the following embodiment, the control circuit 10 uses the values of the air-fuel ratios detected by upstream air-fuel ratio sensors 13A and 13B at different timing. For example, if the distance between the upstream air-fuel ratio sensor 13A and the junction portion 150 is longer than the distance between the upstream air-fuel ratio sensor 13B and the junction portion, the control circuit 10 calculates the average output $V_{1M}$ using the air-fuel ratio currently detected by the upstream air-fuel ratio sensor 13B and the air-fuel ratio detected by the upstream air-fuel ratio sensor 13A DT seconds before. Where, DT is the difference in the times for exhaust gases travelling from the position of the upstream air-fuel ratio sensor to the junction portion in the respective exhaust passages, and determined by the lengths of the respective individual exhaust passages and the operating condition of the engine (i.e., the velocity of the exhaust gas in the exhaust passages).

Since the exhaust gas travelling from the upstream air-fuel ratio sensor 13A to the junction portion requires time longer by DT seconds than the exhaust gas travelling from upstream air-fuel ratio sensor 13B to the junction portion, and the exhaust gas passing the upstream air-fuel ratio sensor 13A DT seconds ago mixes with the exhaust gas currently passing the upstream air-fuel ratio sensor 13B. Therefore, by calculating the average of the output of the upstream air-fuel ratio sensor 13A of DT seconds ago and the present output of the upstream air-fuel ratio sensor 13B, it becomes possible to estimate the air-fuel ratio, after being mixed at the junction portion, accurately.

Figure 16:
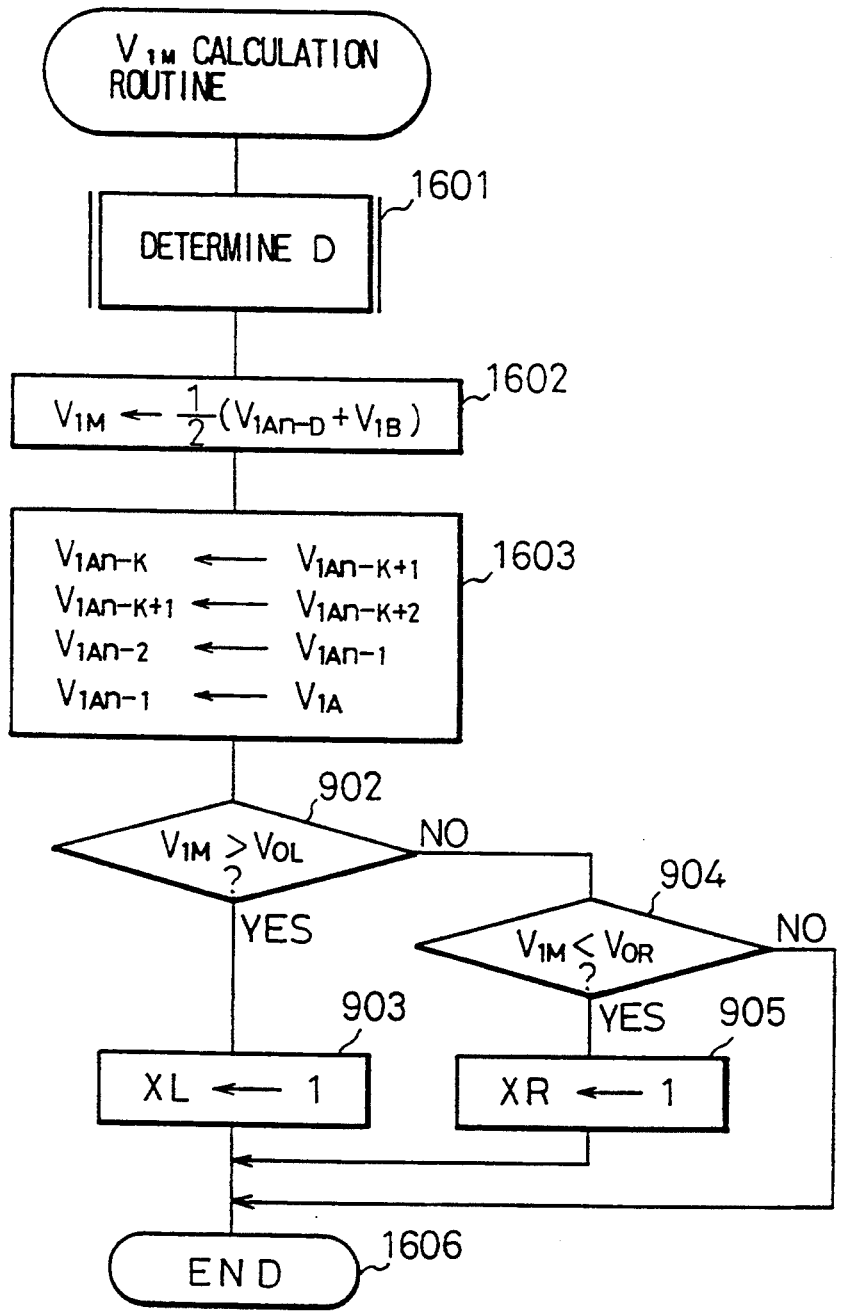

FIG. 16 is a flowchart showing the operation for calculating the average output $V_{1M}$ of the upstream air-fuel ratio sensors 13A and 13B based on the procedure explained above. This routine is executed by the control circuit in lieu of the routine of FIG. 9.

In FIG. 16, when the routine starts, at step 1601, the time difference D is calculated based on the operating condition of the engine. Where, D is the count of the execution of the routine corresponding to the time DT above. In this embodiment, the values of D are determined previously, for example, by experiment, and stored in the ROM 104 of the control circuit 10 as the function of the engine speed N. and the load of the engine represented by the amount of the inlet air flow per revolution of the engine ($Q/N_e$). Then, at step 1602, the average output $V_{1M}$ is calculated by, $$V_{1M}=(\tfrac{1}{2})\cdot(V_{1An-D}+V_{1B})$$

where, $V_{1An-D}$ is the output of the upstream air-fuel ratio sensor 13A when the routine executed D times before. In this embodiment, the outputs of the upstream air-fuel ratio sensor 13A in, for example, last K times execution of the routine ($V_{1An-1}, V_{1An-2}, \ldots, V_{1An-K}$) are always stored in the RAM 105 of the control circuit 10 (K is larger than the maximum value of D), and when D is determined at step 1601, $V_{1A(n-D)}$ is read from the RAM 105.

Then, at step 1603, the values of $V_{1An-1}, V_{1An-2}, \ldots, V_{1An-K}$ are renewed to prepare for the next execution of the routine.

The steps 902 through 906 are exactly the same as FIG. 9, therefore further explanation is not required.

By performing the routine for determining the catalyst deterioration shown by FIGS. 10A and 10B using the average output $V_{1M}$ of the upstream air-fuel ratio sensors calculated above, the effect of the difference in the distance from the upstream air-fuel ratio sensors to the junction portion can be eliminated.

In the above embodiment, the value of D is determined in accordance with the operating condition of the engine at step 1601. However, according to the sizes and the lengths of the individual exhaust passages, there are cases in which the value of D changes only slightly within the whole operating range of the engine. In such a case, a constant value can be used for D regardless of the operating condition of the engine.

From the explanation set force above, it will be understood that according to the present invention, deterioration of the catalytic converter can be detected without forcibly synchronizing the phases of the air-fuel ratio of the respective cylinder banks, thus the deterioration of the control characteristics and the exhaust emission can be prevented.

Although the above embodiments describe the case in which the present invention is applied to a V-type engine having two cylinder groups, the present invention also can be applied to in-line engines having a plurality of cylinder groups, or engines having more than two cylinder groups.

Also, though the above embodiment describes the triple $O_2$ sensor system in which both the starting catalytic converters (which are disposed in the respective individual exhaust passages) and the main catalytic converter (which is disposed in the common exhaust passage) are used, this invention can be also applied to the triple $O_2$ sensor system having only catalytic converters disposed in the respective individual exhaust passages. In this case, if one or more of the catalytic converters has deteriorated, the deterioration can be detected by the procedure explained above. Similarly, it will be understood that the present invention can be also applied to the triple $O_2$ sensor system having only one catalytic converter disposed in the common exhaust passage.

Further, the upstream air-fuel ratio sensors used in the above embodiments are of the type which generates output voltage proportional to the air-fuel ratio of the exhaust gas, and the average of the output voltage of the upstream air-fuel ratio sensors are used for the detection of the deterioration. However, other type air-fuel ratio sensors, for example, having non-linear output characteristics, can also used for upstream air-fuel ratio sensors of the present invention as far as these sensors generate outputs having one to one correspondence to the air-fuel ratio. If such air-fuel ratio sensors are used, the outputs of the upstream air-fuel ratio sensors are converted to actual values of the air-fuel ratio, and the average of the actual air-fuel ratios detected by the upstream air-fuel ratio sensors, instead the direct average of the outputs thereof, is used for the detection of the catalyst deterioration.

Further, though the $O_2$ sensor used for detecting the air-fuel ratio of the exhaust gas downstream of the catalytic converter in this embodiment is an on/off type, the air-fuel ratio sensor of a similar type to the upstream air-fuel ratio sensors can be also used for air-fuel ratio control as well as the detection of the deterioration of the catalytic converter in the present invention.

Therefore, although the present invention has been described with reference to specific embodiments chosen for the purpose of illustration, it should be understood that numerous modifications could be applicable by those skilled in the art without departing from the basic concept and scope of the present invention.

I claim:

1. A device for detecting a deterioration of a three-way catalytic converter for an internal combustion engine, said engine comprising, a plurality of cylinders divided into cylinder groups, individual exhaust passages connected to the respective cylinder groups, a common exhaust passage into which said individual exhaust passages are merged, upstream air-fuel ratio sensors disposed in said respective individual exhaust passages for detecting air-fuel ratios of the exhaust gases in said individual exhaust passages, a downstream air-fuel ratio sensor disposed in said common exhaust passage for detecting an air-fuel ratio of the exhaust gas in said common exhaust passage, at least one three-way catalytic converter disposed in exhaust passage between said upstream air-fuel ratio sensors and said downstream air-fuel ratio sensor, and a means for individually controlling the air-fuel ratio of each cylinder group based on outputs of said respective upstream air-fuel ratio sensors, said device comprising:

an estimating means for estimating the air-fuel ratio of a mixture of the exhaust gases from said respective individual exhaust passages flowing into said common exhaust passage based on the output signals of said upstream air-fuel ratio sensors; and a determining means for determining whether or not said three-way catalytic converter has deteriorated based on the output signal of said downstream air-fuel ratio sensor and said estimated air-fuel ratio of the mixture of the exhaust gas flowing into said common exhaust passage.

2. The device according to claim 1, wherein said estimating means calculates a mean value of the air-fuel ratios of the exhaust gases detected at the same time by said upstream air-fuel ratio sensors disposed in said respective individual exhaust passages, and determines that said means value is the air-fuel ratio of said mixture of the exhaust gases.

3. The device according to claim 2, wherein said determining means comprises, a means for calculating the length of the output signal response curve of said downstream air-fuel ratio sensor and the length of the response curve of said estimated air-fuel ratio of said mixture of the exhaust gases, respectively, a means for calculating the area bounded by the output signal response curve of said downstream air-fuel ratio sensor and a reference voltage line thereof and the area bounded by the response curve of said estimated air-fuel ratio of said mixture of the exhaust gases and a reference air-fuel ratio line, respectively, a means for calculating a ratio of said length of the output signal response curve of the downstream air-fuel ratio sensor and said length of the response curve of the estimated air-fuel ratio, a means for calculating a ratio of said area of the output signal response curve and said area of the response curve of the estimated air-fuel ratio, and determines whether or not said three-way catalytic converter has deteriorated, based on a relationship between said ratio of the lengths and said ratio of the areas.

4. The device according to claim 1, wherein said estimating means calculates a mean value of the air-fuel ratios detected by said upstream air-fuel ratio sensors, at a predetermined sampling interval, and determines that said mean value is the air-fuel ratio of said mixture of the exhaust gases.

5. The device according to claim 4, wherein said predetermined sampling intervals are constant regardless of the operating condition of the engine.

6. The device according to claim 5, wherein said determining means comprises, a means for calculating the length of the output signal response curve of said downstream air-fuel ratio sensor and the length of the response curve of said estimated air-fuel ratio of said mixture of the exhaust gases, respectively, a means for calculating the area bounded by the output signal response curve of said downstream air-fuel ratio sensor and a reference voltage line thereof and the area bounded by the response curve of said estimated air-fuel ratio of said mixture of the exhaust gases and a reference air-fuel ratio line, respectively, a means for calculating a ratio of said length of the output signal response curve of the downstream air-fuel ratio sensor and said length of the response curve of the estimated air-fuel ratio, a means for calculating a ratio of said area of the output signal response curve and said area of the response curve of the estimated air-fuel ratio, and determines whether or not said three-way catalytic converter has deteriorated, based on a relationship between said ratio of the lengths and said ratio of the areas.

7. The device according to claim 4, wherein said predetermined sampling intervals are determined in accordance with the operating condition of the engine.

8. The device according to claim 7, wherein said determining means comprises, a means for calculating the length of the output signal response curve of said downstream air-fuel ratio sensor and the length of the response curve of said estimated air-fuel ratio of said mixture of the exhaust gases, respectively, a means for calculating the area bounded by the output signal response curve of said downstream air-fuel ratio sensor and a reference voltage line thereof and the area bounded by the response curve of said estimated air-fuel ratio of said mixture of the exhaust gases and a reference air-fuel ratio line, respectively, a means for calculating a ratio of said length of the output signal response curve of the downstream air-fuel ratio sensor and said length of the response curve of the estimated air-fuel ratio, a means for calculating a ratio of said area of the output signal response curve and said area of the response curve of the estimated air-fuel ratio, and determines whether or not said three-way catalytic converter(s) has deteriorated, based on a relationship between said ratio of the lengths and said ratio of the areas.

9. The device according to claim 1, wherein said downstream air-fuel ratio sensor is an $O_2$ sensor which generates different voltage signals depend on whether the air-fuel ratio of the exhaust gas is on a rich side or a lean side comparing to the stoichiometric air-fuel ratio.

10. The device according to claim 9, wherein said estimating means calculates a mean value of the air-fuel ratios of the exhaust gases detected at the same time by said upstream air-fuel ratio sensors disposed in said respective individual exhaust passages, and determines that said mean value is the air-fuel ratio of said mixture of the exhaust gases.

11. The device according to claim 10, wherein said determining means comprises, a means for calculating the length of the output signal response curve of said downstream $O_2$ sensor and the length of the response curve of said estimated air-fuel ratio of said mixture of the exhaust gases, respectively, a means for calculating the area bounded by the output signal response curve of said downstream $O_2$ sensor and a reference voltage line thereof and the area bounded by the response curve of said estimated air-fuel ratio of said mixture of the exhaust gases and a reference air-fuel ratio line, respectively, a means for calculating a ratio of said length of the output signal response curve of the downstream $O_2$ sensor and said length of the response curve of the estimated air-fuel ratio, a means for calculating a ratio of said area of the output signal response curve and said area of the response curve of the estimated air-fuel ratio, and determines whether or not said three-way catalytic converter has deteriorated, based on a relationship between said ratio of the lengths and said ratio of the areas.

12. The device according to claim 9, wherein said estimating means calculates a mean value of the air-fuel ratios detected by said upstream air-fuel ratio sensors at a predetermined sampling intervals between said upstream air-fuel ratio sensors, and determines that said mean value is the air-fuel ratio of said mixture of the exhaust gases.

13. The device according to claim 12, wherein said predetermined sampling intervals are constant regardless of the operating condition of the engine.

14. The device according to claim 13, wherein said determining means comprises, a means for calculating the length of the output signal response curve of said downstream air-fuel ratio sensor and the length of the response curve of said estimated air-fuel ratio of said mixture of the exhaust gases, respectively, a means for calculating the area bounded by the output signal response curve of said downstream $O_2$ sensor and a reference voltage line thereof and the area bounded by the response curve of said estimated air-fuel ratio of said mixture of the exhaust gases and a reference air-fuel ratio line, respectively, a means for calculating a ratio of said length of the output signal response curve of the downstream $O_2$ sensor and said length of the response curve of the estimated air-fuel ratio, a means for calculating a ratio of said area of the output signal response curve and said area of the response curve of the estimated air-fuel ratio, and determines whether or not said three-way catalytic converter has deteriorated, based on a relationship between said ratio of the lengths and said ratio of the areas.

15. The device according to claim 12, wherein said predetermined sampling intervals are determined in accordance with the operating condition of the engine.

16. The device according to claim 15, wherein said determining means comprises, a means for calculating the length of the output signal response curve of said downstream O$_2$ sensor and the length of the response curve of said estimated air-fuel ratio of said mixture of the exhaust gases, respectively, a means for calculating the area bounded by the output signal response curve of said downstream O$_2$ sensor and a reference voltage line thereof and the area bounded by the response curve of said estimated air-fuel ratio of said mixture of the exhaust gases and a reference air-fuel ratio line, respectively, a means for calculating a ratio of said length of the output signal response curve of the downstream O$_2$ sensor and said length of the response curve of the estimated air-fuel ratio, a means for calculating a ratio of said area of the output signal response curve and said area of the response curve of the estimated air-fuel ratio, and determines whether or not said three-way catalytic converter has deteriorated, based on a relationship between said ratio of the lengths and said ratio of the areas.

* * * * *